US009050839B2

(12) United States Patent
Aruga et al.

(10) Patent No.: US 9,050,839 B2
(45) Date of Patent: Jun. 9, 2015

(54) REFERENCE POSITION DETECTION DEVICE FOR ROTARY MECHANISM, PLATEN GAP ADJUSTMENT MECHANISM, AND PRINTER

(71) Applicant: Seiko Epson Corporation, Toyko (JP)

(72) Inventors: Yuichi Aruga, Nagano-ken (JP); Toshihiro Imae, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/226,408

(22) Filed: Mar. 26, 2014

(65) Prior Publication Data

US 2014/0292847 A1 Oct. 2, 2014

(30) Foreign Application Priority Data

Mar. 27, 2013 (JP) ................................. 2013-065781

(51) Int. Cl.
*B41J 25/308* (2006.01)
*G01B 11/14* (2006.01)

(52) U.S. Cl.
CPC .................................... *B41J 25/308* (2013.01)

(58) Field of Classification Search
CPC ...................................................... B41J 25/308
USPC ................ 347/8, 22; 356/614; 400/58, 144.2; 270/45
See application file for complete search history.

(56) References Cited

U.S. PATENT DOCUMENTS

| | | | | |
|---|---|---|---|---|
| 5,479,194 | A * | 12/1995 | Hirano et al. | 347/22 |
| 2004/0258443 | A1* | 12/2004 | Takeshita et al. | 400/58 |
| 2005/0253880 | A1 | 11/2005 | Nakamura et al. | |
| 2006/0193670 | A1* | 8/2006 | Fukumasu et al. | 400/144.2 |
| 2009/0284556 | A1* | 11/2009 | Okazawa et al. | 347/8 |
| 2013/0307206 | A1* | 11/2013 | Izumichi et al. | 270/45 |

FOREIGN PATENT DOCUMENTS

| | | | |
|---|---|---|---|
| JP | 08-189596 | A | 7/1996 |
| JP | 2005-103835 | A | 4/2005 |
| JP | 2005-280206 | A | 10/2005 |
| JP | 2005-280209 | A | 10/2005 |

* cited by examiner

*Primary Examiner* — Julian Huffman
*Assistant Examiner* — Carlos A Martinez

(57) ABSTRACT

A small, compactly configured reference position detection device 170 for a rotary transfer mechanism includes a rotary member 130 that can rotate through a rotational angle less than one revolution from a first rotational position past a second rotational position and reference position to a third rotational position; a detection flag disc 151 that can move in a range from a first position past a detection position to a second position; a detector 162 that detects the detection flag passing the detection position, and a flag moving mechanism. The flag moving mechanism can move the detection flag disc 151 tracking the rotary member 130. The position of detection flag disc 151 movement when passing the reference position of the rotary member 130 is the detection position.

6 Claims, 18 Drawing Sheets

REFERENCE POSITION DETECTION DEVICE FOR ROTARY MECHANISM, PLATEN GAP ADJUSTMENT MECHANISM, AND PRINTER

BACKGROUND

1. Technical Field

The present invention relates to a reference position detection device for a rotary mechanism that detects a rotational reference position within one revolution of a rotary member. A reference position detection device for a rotary mechanism of the invention can be used in a platen gap adjustment mechanism to adjust the gap between the printhead and platen in a printer.

2. Related Art

Printers such as inkjet printers commonly have a platen gap adjustment mechanism to adjust the gap between the nozzle face of the inkjet head and the platen, or the gap between the nozzle face and the printing surface of the print medium conveyed over the platen.

JP-A-2005-280206 and JP-A-2005-280209 teach printers having this type of platen gap adjustment mechanism. A carriage carrying the printhead is supported by two carriage guide rails in these printers. The two carriage guide rails are attached to an elevator frame, and the elevator frame is attached to move vertically on the side frame of the printer.

These printers transfer rotation of the elevator motor attached to the printer frame through a geared rotary mechanism to a carriage guide rail. Rotation transferred to the carriage guide rail is then transferred to a gear train of multiple spur gears to the other carriage guide rail. At the end of each carriage guide rail is a cam mechanism that changes rotation of the carriage guide rails to vertical movement of the carriage guide rails. When the carriage guide rails rotate synchronously, the cam mechanism causes the carriage guide rails to move vertically synchronously, and the gap between the recording head on the carriage and the platen on the stationary side changes.

Adjusting the platen gap is controlled based on the rotational position of the rotary mechanism that is part of the platen gap adjustment mechanism. During the initialization operation, the reference position (home position) is detected within one revolution of the rotary member of the rotary mechanism, the amount and direction of rotation of the rotary member are controlled based on the reference position, and the platen gap is adjusted.

JP-A-H08-189596 discloses a reference position detection device for a rotary mechanism. This device has a detection flag that protrudes to the outside from the outside of a rotary member, and a transmissive photosensor disposed to a fixed position on the outside of the rotary member. The transmissive photosensor detects the edge of the detection flag rotating in unison with the rotary member, and the rotational position of the rotary member when the edge is detected is set as the reference position of the rotary member.

In the reference position detection device of the rotary mechanism according to the related art the detection flag turns one revolution with the rotary member. Space for the rotating detection flag to move must therefore be provided around the entire outside circumference of the rotary member. Parts disposed outside the rotary member must therefore be located outside the space through which the detection flag moves. The required outside diameter of the reference position detection device therefore increases, and the device cannot be made small and compact.

The platen gap adjustment mechanism of a printer is generally disposed on the side of the width of the paper conveyance path. Components of a transfer mechanism that transfers rotation to the paper conveyance roller, for example, are disposed beside the paper conveyance path. Providing sufficient space sufficient to assemble a platen gap adjustment mechanism may therefore not be possible. A small, compactly configured reference position detection device for a rotary mechanism assembled in a platen gap adjustment mechanism would therefore be extremely useful.

SUMMARY

A small, compactly configured reference position detection device according to the present invention for a rotary mechanism requires little space for movement of a detection flag around the rotary member.

A platen gap adjustment mechanism and a printer according to the invention use the reference position detection device for a rotary mechanism according to the invention.

A reference position detection device of a rotary mechanism according to one aspect of the invention includes: a rotary member that can rotate through a rotational angle of less than one revolution from a first rotational position past a second rotational position and reference position to a third rotational position; a detection flag that can move in a range from a first position past a detection position to a second position; a detector that detects the detection flag passing the detection position; and a flag moving mechanism that engages the rotary member rotating from the second rotational position to the third rotational position and moves the detection flag from the first position to the second position, follows the rotary member rotating from the third rotational position to the second rotational position, and moves the detection flag from the second position to the first position, the position of detection flag movement when passing the reference position of the rotary member being the detection position.

The detection flag moves between a first position and a second position by means of a rotary member that rotates from a second rotational position to a third rotational position. Because the reference position of the rotary member is between the second rotational position and the third rotational position, the reference position of the rotary member can be known by detecting the detection flag at a movement position corresponding to the detection position by means of a detector. Because the angle between the second rotational position and the third rotational position can be a small angle including the reference position, the detection flag only needs to be moved a small amount by the rotary member rotating through this angular range. Little space is therefore required for movement of the detection flag, and a small, compact reference position detection device can be achieved.

In another aspect of the invention, the detection flag can rotate from the first position to the second position on the same axis of rotation as the rotary member.

When the detection flag is disposed coaxially to the rotary member and moves in the direction of rotation, the rotational angle of detection flag movement can be a very small angular range. Less space is therefore required for detection flag movement than with a reference position detection device in which the detection flag and rotary member rotate substantially one revolution together. The space around the rotary member and the detection flag can therefore be used for other parts or components. A small, compact reference position detection device for a rotary member can therefore be achieved.

In a reference position detection device of a rotary mechanism according to another aspect of the invention, the flag moving mechanism includes a motion limiter that defines the first position of the detection flag, an urging member that urges the detection flag from the second position toward the first position, a rotary-side engaging part formed on the rotary member, and a flag-side engaging part formed on the detection flag. The rotary-side engaging part can engage the flag-side engaging part when the rotary member rotates in the direction from the first rotational position toward the third rotational position; and engagement between the flag-side engaging part and the rotary-side engaging part is maintained by the urging force of the urging member while the rotary member rotates from the third rotational position to the second rotational position.

When the rotary member is in a rotational position between the first rotational position and the reference position, the detection flag is between the first position and the detection position. The detection flag is therefore not detected by the detector. If the rotary member is positioned between the first rotational position and the second rotational position at this time, the rotary member is not engaged with the detection flag, and the detection flag is held by the urging force of the urging member at the first position defined by the stop. When the rotary member is between the second rotational position and the reference position, the rotary member engages the detection flag, and the detection flag moves against the urging force to a position from the first position to the detection position.

When the rotary member then rotates toward the third rotational position, the detection flag moves from the first position toward the second position, and passes the detection position. When the detection flag passes the detection position, the detection flag is detected by the detector, and detector output changes from the state when the detection flag is not detected to the state when the flag is detected. For example, the output signal state changes when the edge of the detection flag passes the detection position. This position is detected as the reference position of the rotary member.

When the rotary member is at the third rotational position or between the third rotational position and the reference position, the detection flag is between the second position and the detection position. The detector is therefore in the state detecting the detection flag. When the rotary member turns toward the first rotational position, the detection flag follows the rotary member due to the urging force of the urging member, and moves toward the first position. When the detection flag passes the detection position, the detector changes from the state when the detection flag is detected to the state when the detection flag is not detected. The rotary member is detected to be in the reference position at this time. When the detection flag reaches the first position, it stops at the first position due to the motion limiter, and is disengaged from the rotary member.

In both events, the detection flag moves at most between the first position and the second position to set the reference position within one revolution of the rotary member. The range of detection flag movement is therefore significantly less than when detecting the reference position of the rotary member within one revolution by moving the detection flag through a maximum range between the first position and the second position together with the rotary member.

In another aspect of the invention the detection flag includes a disc-shaped or annular body, a contact protrusion that protrudes radially to the outside from the outside surface of the body, and a detection protrusion that protrudes radially to the outside from the outside surface of the body at a position circumferentially separated from the contact protrusion. The motion limiter is positioned in the path of contact stop movement accompanying rotation of the detection flag; and the detector detects when the detection protrusion passes.

A reference position detection device of a rotary mechanism according to another aspect of the invention preferably also has a control unit that detects a reference position within one revolution of the rotary member based on output of the detector, and controls rotation of the rotary member based on the reference position. In this aspect of the invention the control unit sets the reference position of the rotary member as described below.

The control unit first detects if the detection flag is detected by the detector. If the detection flag is detected by the detector, the control unit rotates the rotary member toward the first rotational position, detects when the detector changes from detecting to not detecting the detection flag, and sets the rotational angle position of the rotary member at that time as the reference position. If the detection flag is not detected by the detector, the control unit rotates the rotary member toward the third rotational position, detects when the detector changes from not detecting to detecting the detection flag, and sets the rotational angle position of the rotary member at that time as the reference position.

During the reference position detection operation the detection flag protruding to the outside from the outside of the rotary member turns at most from the first position to the second position. Space for the detection flag that detects a part on the outside of the rotary member is therefore not needed around the entire circumference of the rotary member. Little space is therefore needed for the detection flag to move, and the outside diameter of the device can be small.

Another aspect of the invention is a platen gap adjustment mechanism that has a motor and a rotary member rotationally driven by the motor, and adjusts the gap between a printhead and a platen based on the rotational angle position within one revolution of the rotary member, the platen gap adjustment mechanism including: a reference position detection device that detects a reference position within one revolution of the rotary member, the reference position detection device being the reference position detection device described above.

Because the reference position detection device of a rotary mechanism according to the invention can be configured small and compact, a platen gap adjustment mechanism incorporating the reference position detection device can also be configured small and compact.

Because a platen gap adjustment mechanism incorporating the reference position detection device of a rotary mechanism according to the invention can be configured small and compact, the platen gap adjustment mechanism can also be advantageously used to make a printer small and compact.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures. The following embodiment describes the invention applied to detecting the reference position of a platen gap adjustment mechanism used in an inkjet printer with a reversing unit enabling two-sided printing. The invention can obviously also be used as a device for detecting the reference position of a rotary mechanism other than the platen gap adjustment mechanism of a printer.

General Configuration of a Printer

Figure 1:
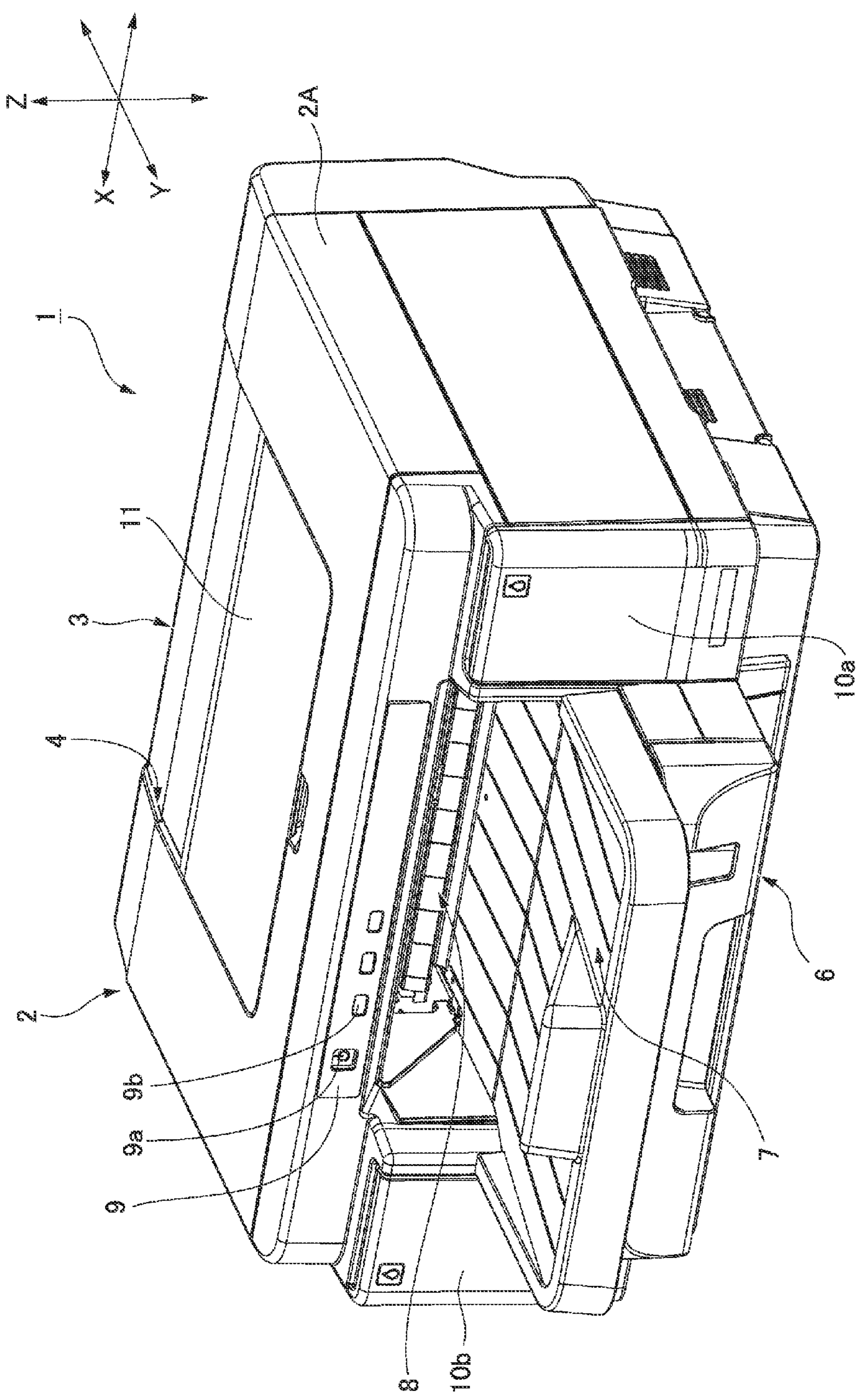
FIG. 1 is an oblique front view of a printer according to the invention.
Figure 2:
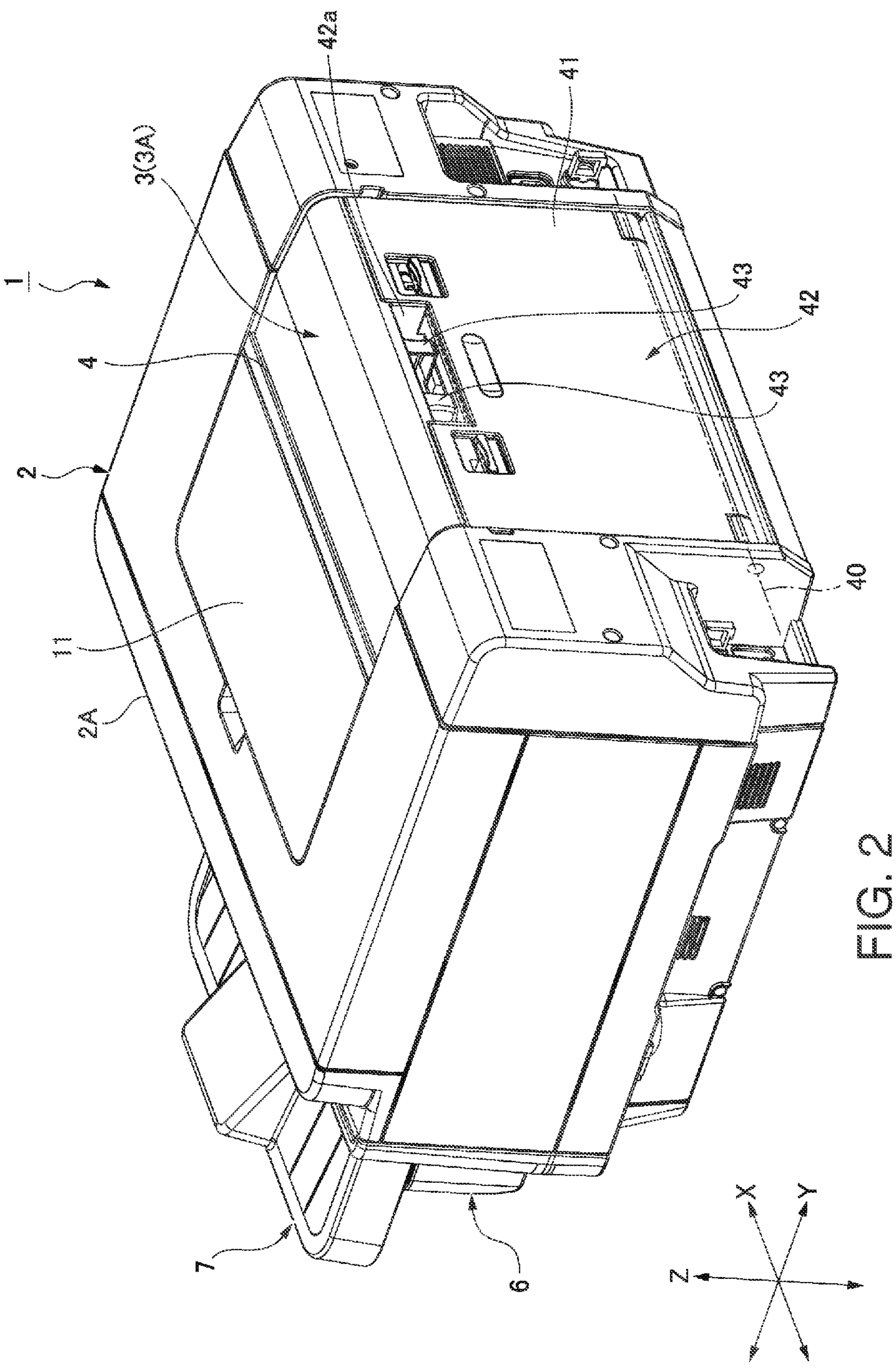
FIG. 2 is an oblique rear view of the printer.
Figure 3:
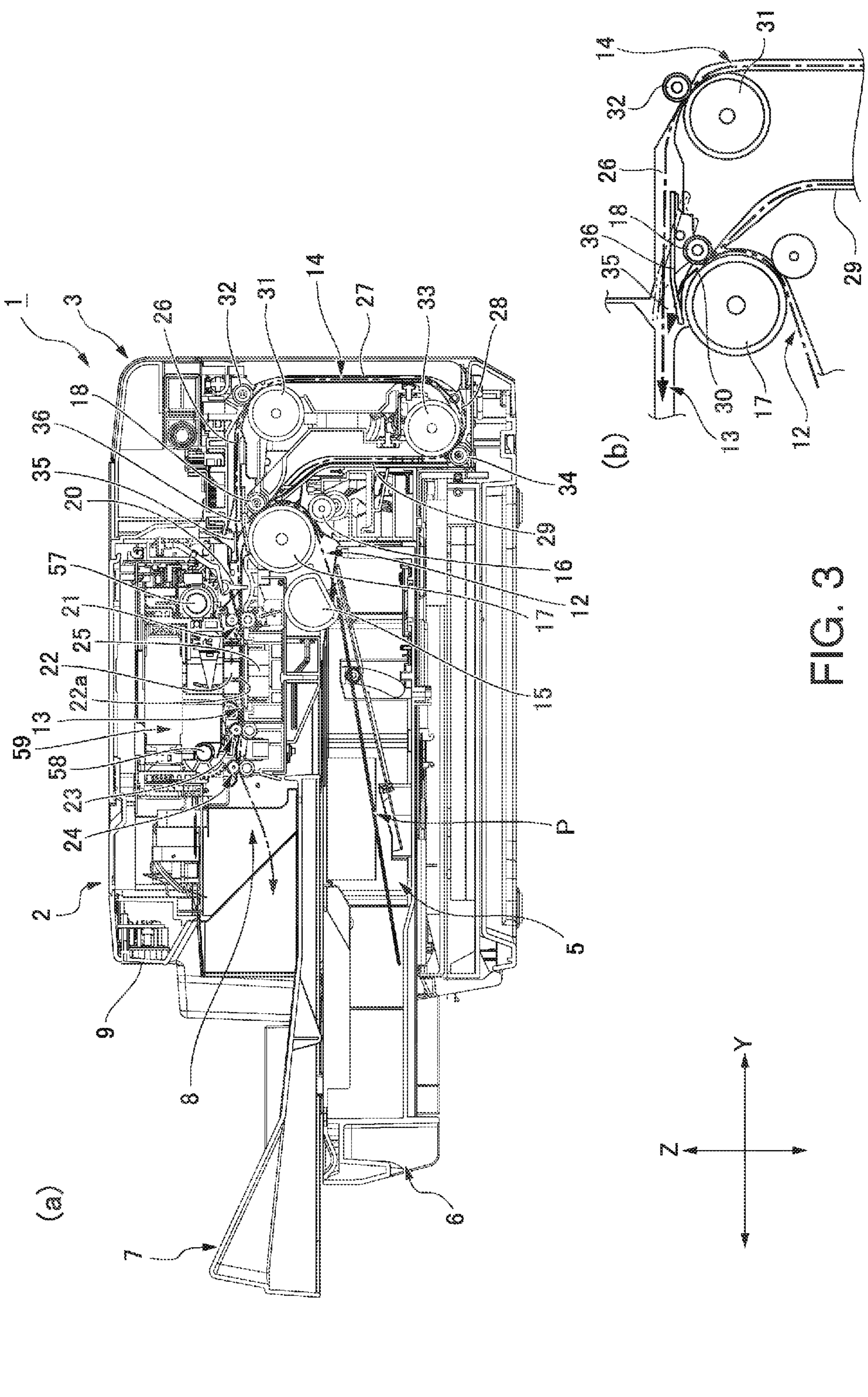
FIG. 3 is a vertical section view and a partial section view of the printer.

FIG. 1 is an external oblique view from the front of an inkjet printer ("printer" below) according to this embodiment of the invention, and FIG. 2 is an external oblique view of the printer from the back. FIG. 3 (*a*) is a vertical section view and FIG. 3 (*b*) is a partial section view of the internal configuration of the printer.

The general configuration of the printer 1 is described referring primarily to FIG. 1 and FIG. 2. The printer 1 has a printer cabinet 2 and a reversing unit 3. The printer cabinet 2 includes a main case 2A with a basically rectangular box-like shape that is long on the transverse axis X widthwise to the printer, and having a recess 4 in the middle of the back where the reversing unit 3 is installed. The reversing unit 3 is a unit for reversing the front and back sides of the printing paper ("paper" below), which is a form of sheet media, and then returning the reversed paper into the printer cabinet 2. The reversing unit 3 is a reversing unit that can open and close as further described below, and can pivot on the bottom part on the vertical axis Z of the printer to open to the back of the printer on the longitudinal axis Y.

A paper cassette loading unit 5 is disposed to the front of the printer cabinet 2. The paper cassette loading unit 5 opens to the front on the longitudinal axis Y at a position toward the bottom on the vertical axis Z in the front of the printer cabinet 2. A paper cassette 6 can be loaded from the front into the paper cassette loading unit 5. A paper discharge tray 7 is attached at the top of the paper cassette loading unit 5. The paper discharge tray 7 extends substantially horizontally to the front. A rectangular paper exit 8 extending toward the back of the printer is formed at the top of the paper discharge tray 7.

An operating panel 9 is at the front of the printer above the paper exit 8. The operating panel 9 includes a power switch 9*a* and a plurality of state indicators 9*b*. Rectangular access doors 10*a*, 10*b* are attached to the front of the printer on opposite sides of the paper discharge tray 7 and paper exit 8. When the access doors 10*a*, 10*b* are open, the ink cartridge loading unit (not shown in the figure) opens and the ink cartridges (not shown in the figure) can be replaced.

The top of the printer is flat, and has an access cover 11 attached in the middle for maintenance.

Paper Conveyance Path of the Printer

The internal configuration of the printer 1, and particularly the paper conveyance path, is described next with reference to FIG. 3. A paper supply path 12, main conveyance path 13, and reversing conveyance path 14 are formed inside the printer 1. The paper supply path 12 and main conveyance path 13 are formed inside the printer cabinet 2, and the reversing conveyance path 14 is formed inside the reversing unit 3.

The paper supply path 12 is a conveyance path that conveys paper P of a specific size stored in a stack in the paper cassette 6 to the main conveyance path 13. The paper supply path 12 extends diagonally up from the back end of the paper cassette loading unit 5 on the longitudinal axis Y, curves toward the front, and connects to the main conveyance path 13. Paper P stored in the paper cassette 6 is fed by a paper feed roller 15 to the paper supply path 12. The supplied paper is fed one sheet at a time through the nipping part of a conveyance roller 17 and a retard roller 16, which is a media separation roller. The paper P conveyed through the nipping part of the retard roller 16 and conveyance roller 17 is conveyed through the nipping part of the conveyance roller 17 and a follower roller 18 to the main conveyance path 13.

The main conveyance path 13 is the conveyance path extending substantially horizontally along the longitudinal axis Y to the paper exit 8. Disposed along the main conveyance path 13 from the upstream side in the paper conveyance direction are a paper detection lever 20, a paper feed roller pair 21, a printhead 22, a first discharge roller pair 23, and a second discharge roller pair 24. The printhead 22 is an inkjet head, and a platen 25 is disposed opposite the nozzle face with a specific gap therebetween.

Paper fed from the paper supply path 12 to the main conveyance path 13 is conveyed by the conveyance roller 17 to the paper feed roller pair 21 while pushing up on the paper detection lever 20. The paper fed into the paper feed roller pair 21 is conveyed past the printing position of the printhead 22 by the paper feed roller pair 21 toward the first discharge roller pair 23. The paper fed to the first discharge roller pair 23 passes the first discharge roller pair 23 and second discharge roller pair 24, and is discharged from the paper exit 8 onto the paper discharge tray 7.

The reversing conveyance path 14 formed inside the reversing unit 3 is located below the main conveyance path 13 on the vertical axis Z, and is a conveyance path that generally forms a loop. The reversing conveyance path 14 includes an upstream path 26 that connects to the upstream end of the main conveyance path 13 and extends substantially horizontally to the back on the longitudinal axis Y, a descending path 27 that curves and extends down in a straight line on the vertical axis Z from the upstream path 26, a bottom path 28 that connects to the descending path 27 and curves to the front on the longitudinal axis Y, and an ascending path 29 that curves and extends upward from the bottom path 28.

The top part of the ascending path 29 curves at an angle to the printer front, and merges with the paper supply path 12 in the middle. More specifically, ascending path 29 and the downstream part of the paper supply path 12 form a common path 30. This common path 30 is a curved path extending along the outside of the conveyance roller 17.

A first conveyance roller 31 and a follower roller 32 are disposed between the upstream path 26 and the descending path 27, and a second conveyance roller 33 and a follower roller 34 are disposed between the bottom path 28 and the ascending path 29. Paper conveyed from the main conveyance path 13 to the reversing conveyance path 14 is nipped by the first conveyance roller 31 and follower roller 32, then conveyed by the first conveyance roller 31 to the nipping part of the second conveyance roller 33 and follower roller 34, and then conveyed by the second conveyance roller 33 to the nipping part of the conveyance roller 17 and follower roller 18. The paper is then fed by the conveyance roller 17 to the main conveyance path 13 again.

By passing through the loop of this reversing conveyance path 14, the paper is reversed front and back and returned to the main conveyance path 13. Printing on both sides of the paper is therefore enabled by conveying the paper through the reversing conveyance path 14.

A path-changing flapper 36 is disposed at the junction 35 of the upstream end of the main conveyance path 13, the upstream end of the reversing conveyance path 14, and the downstream end of the common path 30. The path-changing flapper 36 can pivot up and down on the vertical axis Z at the back end of the flapper 36 on the longitudinal axis Y. The path-changing flapper 36 is normally held by its own weight in a first position with the main part of the flat at the front on the longitudinal axis Y resting on the outside of the conveyance roller 17.

Paper reversed from the main conveyance path 13 side in this position is guided by the path-changing flapper 36 to the reversing conveyance path 14 side. The paper then passes through the reversing conveyance path 14 and returns to the junction 35. The path-changing flapper 36 is pushed up by the paper returned to the junction 35, and can move from the first position to a second position. When the path-changing flapper 36 is pushed up to the second position, the common path 30 at the downstream end of the reversing conveyance path 14 communicates with the main conveyance path 13. The paper is therefore conveyed to the main conveyance path 13 while pushing the path-changing flapper 36 up. After the paper has past, the path-changing flapper 36 returns by its own weight to the first position.

The path-changing flapper 36 is also pushed up by the paper fed from the paper supply path 12 to the main conveyance path 13 when paper is supplied from the paper cassette 6. After the paper passes, the path-changing flapper 36 returns of its own weight to the first position. Paper reversed from the main conveyance path 13 will therefore not go through the common path 30 into the reversing conveyance path 14 or the paper supply path 12. The paper path can also be changed by a simple configuration without using a separate drive power source or urging member.

Openable Reversing Unit

Figure 4:
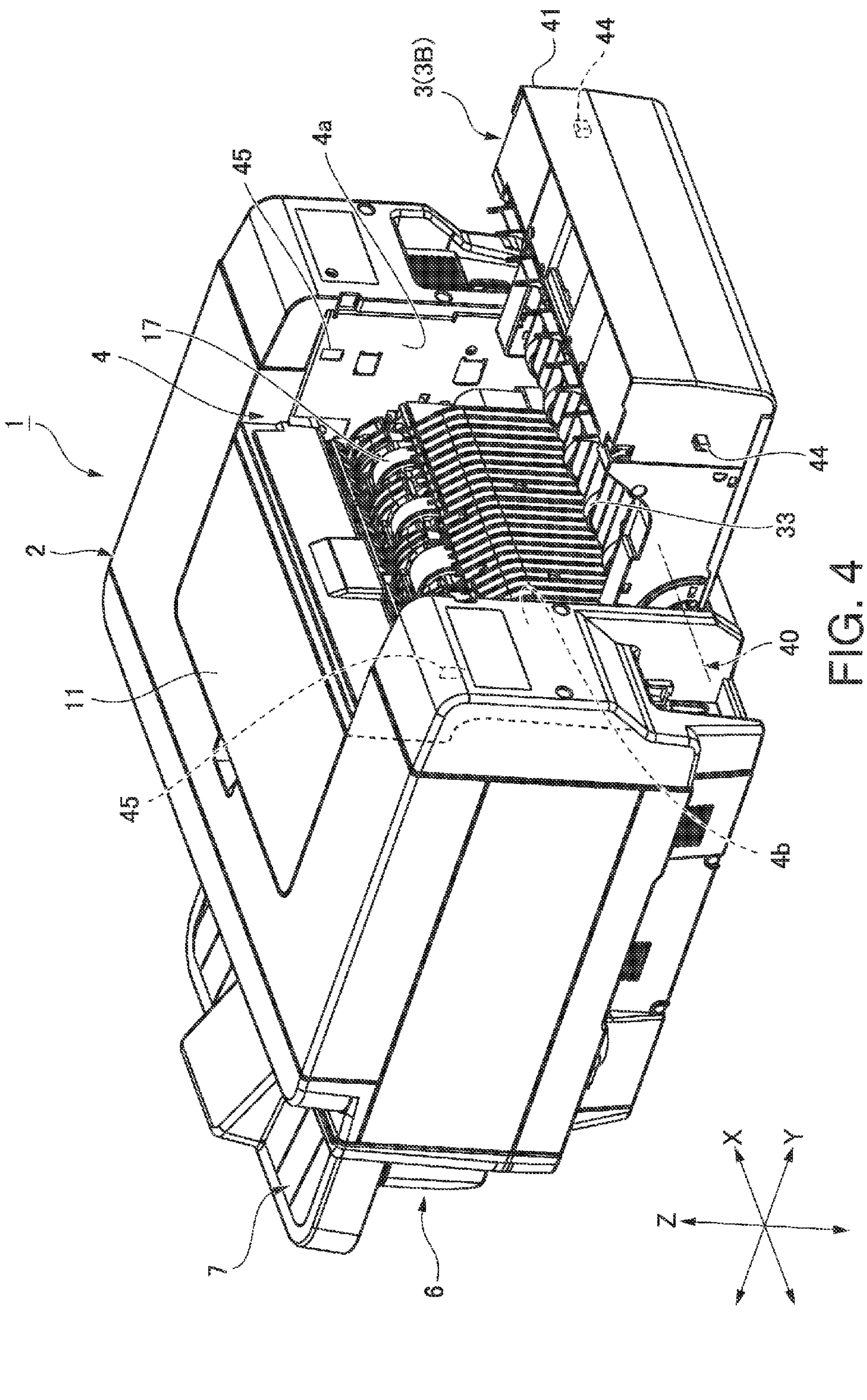
FIG. 4 is an oblique rear view of the printer when the reversing unit is open.

FIG. 4 is an external oblique view from the back of the printer 1 when the reversing unit 3 is open.

As will be understood from FIG. 2 and FIG. 4, the reversing unit 3 can open and close pivoting on a pivot axis 40 located at the bottom on the vertical axis Z of the printer. When in the closed position 3A shown in FIG. 2, the reversing unit 3 is standing upright on the vertical axis Z, and the back cover 42 of the reversing unit case 41 is positioned substantially flush with the back left and right sides of the printer cabinet 2. In the open position 3B shown in FIG. 4, the reversing unit 3 is dropped to the back on the longitudinal axis Y to a substantially level position. In the open position 3B, the ascending path 29 on the downstream side of the reversing conveyance path 14, and the common path 30, are open as will be understood from FIG. 4. Paper jams and other problems occurring on these conveyance paths can be easily handled by opening the reversing unit 3.

As shown in FIG. 2, the reversing unit 3 has an opening 42*a* in the middle at the top of the back cover 42 on the vertical axis Z. A pair of lever operators 43 are exposed through this opening 42*a*. When the pair of lever operators 43 is operated so that they close together, left and right lock pins 44 (FIG. 4) protruding to the side from the left and right sides of the reversing unit 3 disengage matching catches 45 (FIG. 4) formed in the left and right sides of the printer cabinet 2. The reversing unit 3 is thus unlocked and can be opened.

Print Mechanism Unit

Figure 5:
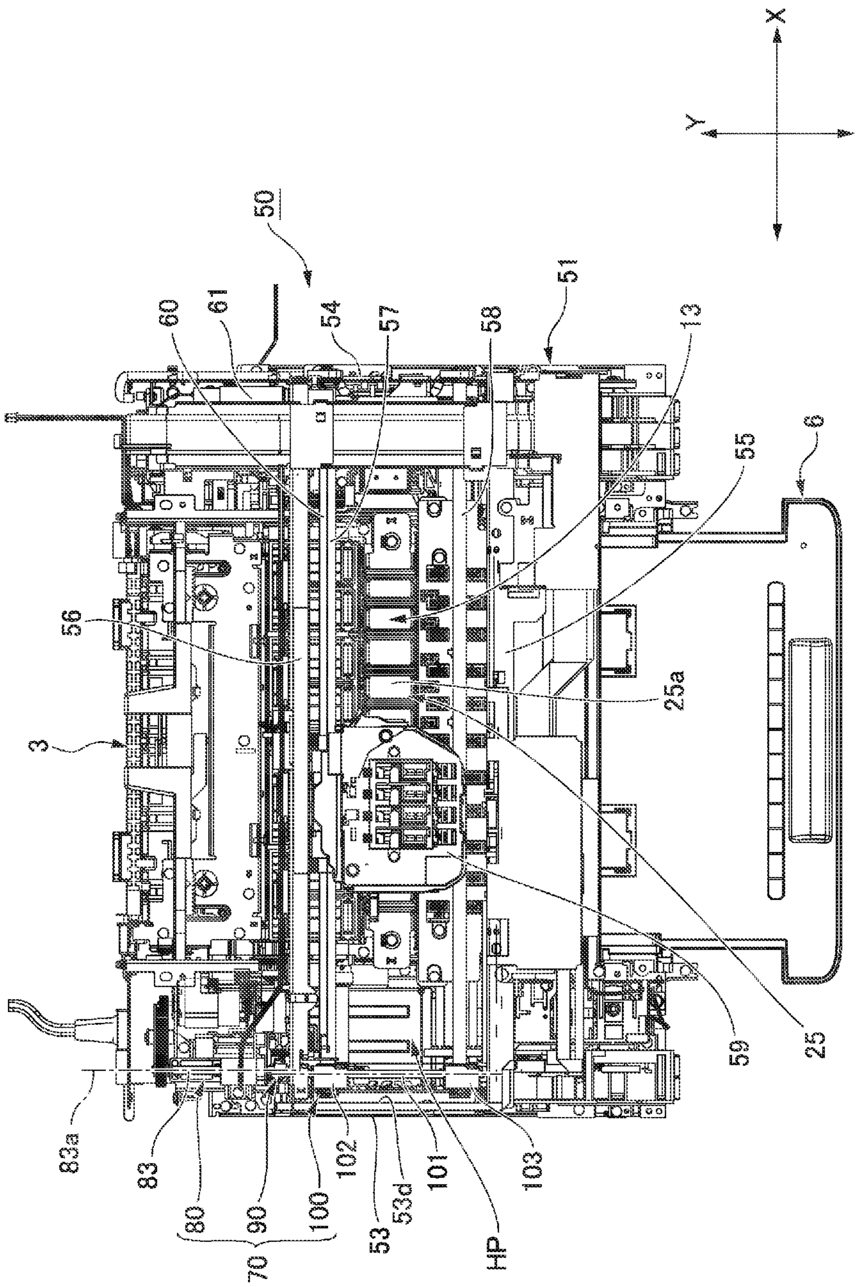
FIG. 5 is a plan view showing the print mechanism unit of the printer.
Figure 6:
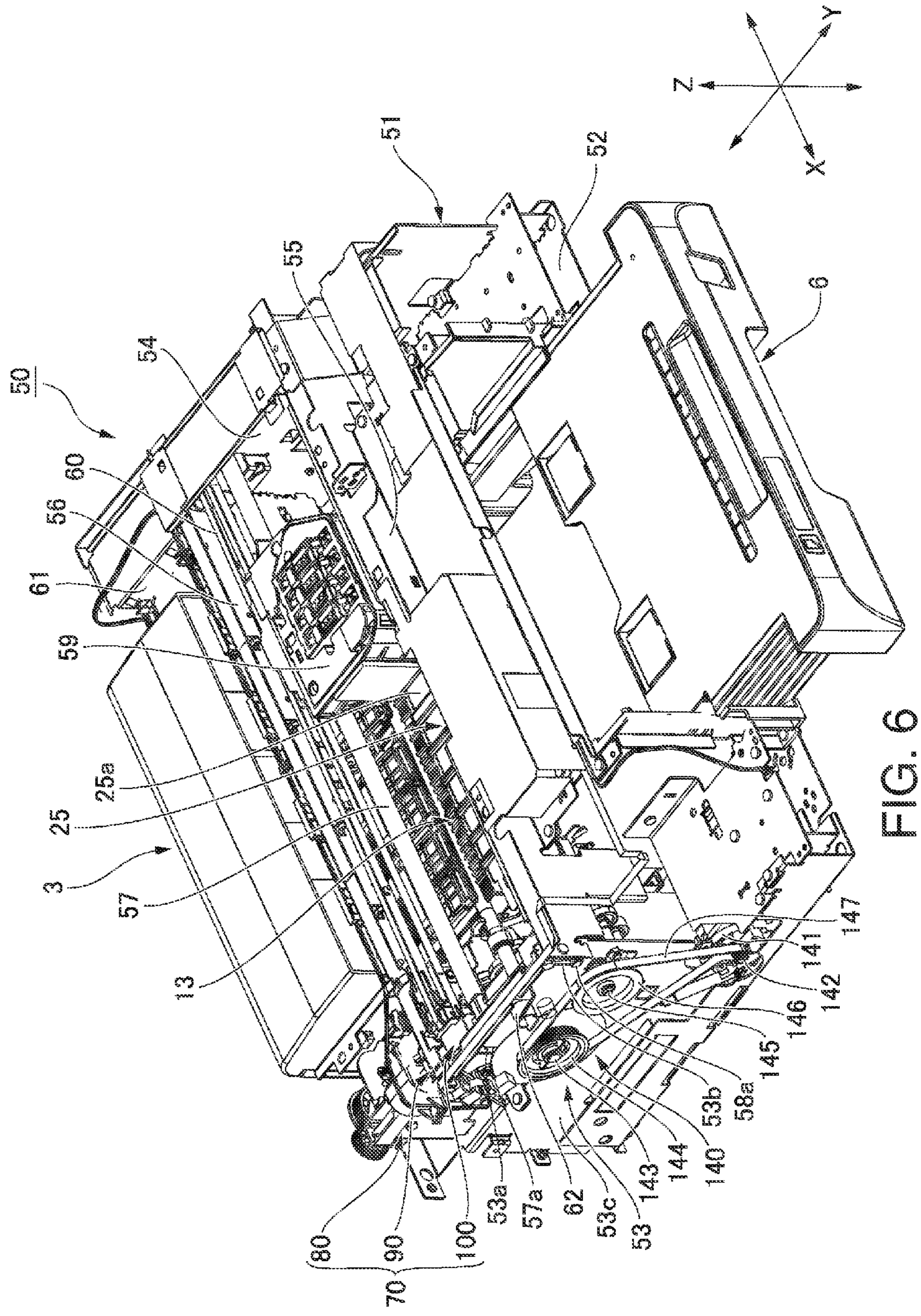
FIG. 6 is an oblique view of the print mechanism unit from the front.
Figure 7:
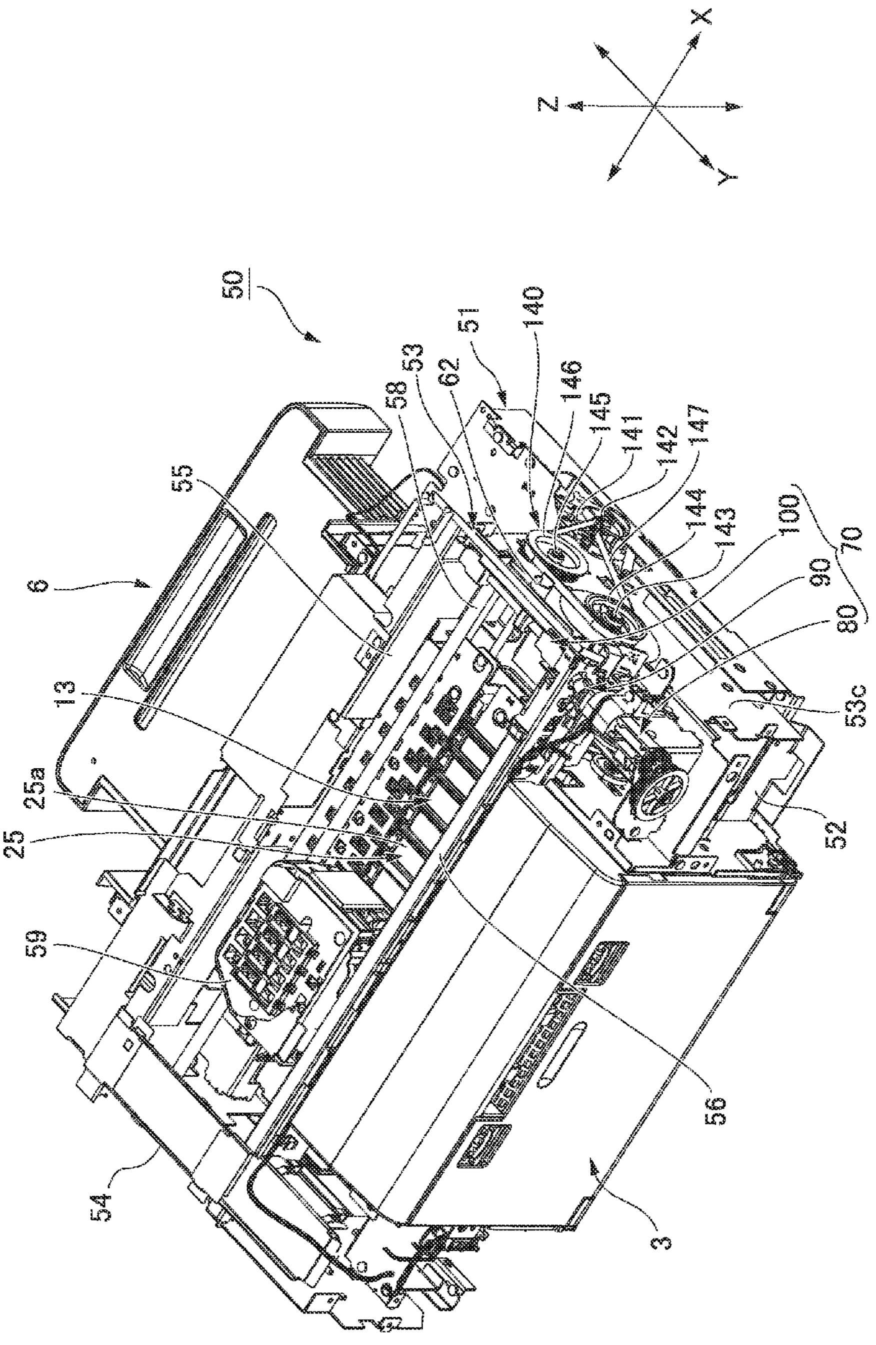
FIG. 7 is an oblique view of the print mechanism unit from the back.

FIG. 5 to FIG. 7 are a plan view, and oblique views from the front and back, respectively, of the print mechanism unit that is covered by the main case 2A of the printer 1. FIG. 5 shows the print mechanism unit with the main case 2A, paper discharge tray 7, and unit case 41 of the reversing unit 3 removed, and FIG. 6 and FIG. 7 show the print mechanism unit with the main case 2A and the paper discharge tray 7 removed.

As shown in the figures, the print mechanism unit 50 includes a sheet metal print unit frame 51 to which parts of the print mechanism unit 50 are assembled. The print unit frame 51 includes a base frame 52, and side frames 53, 54 rising perpendicularly from the base frame 52 at positions on opposite sides of the transverse axis X. A front frame 55 and a rear frame 56 span transversely between the side frames 53, 54.

Two carriage guide rails 57, 58 span parallel to the transverse axis X between the front frame 55 and rear frame 56 at positions between the vertical top parts of the side frames 53, 54. The carriage guide rail 57 located on the rear frame 56 side is referred to below as the first guide rail 57, and the carriage guide rail 58 located on the front frame 55 side is referred to as the second guide rail 58. A head carriage 59 is mounted on the first and second guide rails 57, 58.

The head carriage 59 can slide in the transverse axis X along the first and second guide rails 57, 58. The head carriage 59 is connected to a timing belt 60 extending on the transverse axis X at a position near the first guide rail 57. The timing belt 60 is driven by a carriage drive motor 61.

The printhead 22 is mounted on the head carriage 59. The printhead 22 is mounted on the head carriage 59 with the nozzle face 22*a* (FIG. 3) facing down. A platen 25 is disposed below the printhead 22. The platen 25 is a multi-part platen having plural platen segments 25*a* side by side on the transverse axis X, which is the direction of printhead 22 travel. The printhead 22 can move by means of the head carriage 59 between the home position HP on the side of one side frame 53, and an away position on the side of the other side frame 54. In other words, the printhead 22 can travel reciprocally widthwise across the main conveyance path 13 (print medium conveyance path) formed between the side frames 53, 54.

The drive transfer mechanism of the media conveyance rollers is assembled to the outside surface 53*c* of the side frame 53 facing the outside of the printer. In this example, the drive transfer mechanism 140 of the paper feed roller pair 21 and first discharge roller pair 23, which are media conveyance rollers, is assembled to the outside surface 53*c*. The paper feed roller pair 21 and first discharge roller pair 23 are disposed to the main conveyance path 13, which is the print medium conveyance path, on the upstream and downstream sides of the platen 25, respectively, and below the first and second guide rails 57, 58 (FIG. 3).

The drive transfer mechanism 140 is described next with reference to FIG. 6 and FIG. 7. A paper feed motor 141 is mounted on the base frame 52 on the side frame 53 side. The paper feed motor 141 is on the side facing the outside of the printer on the transverse axis X, and a pinion 142 is fixed coaxially to the distal end of the motor shaft.

The end part 143 of the roller shaft of the drive-side roller of the paper feed roller pair 21 is supported freely rotationally by the side frame 53, and protrudes to the outside. A transfer gear 144 is fixed coaxially to the protruding end part 143.

The end part 145 of the roller shaft of the drive-side roller of the first discharge roller pair 23 is similarly supported freely rotationally by the side frame 53, and protrudes to the outside. A transfer gear 146 is fixed coaxially to the protruding end part 145.

A timing belt 147 is mounted on the pinion 142, transfer gear 144, and transfer gear 146.

Platen Gap Adjustment Mechanism

A platen gap adjustment mechanism 70 capable of adjusting the gap between the printhead 22 and platen 25 is also disposed to the print mechanism unit 50. The gap between the printhead 22 and platen 25 is the distance from the nozzle face 22*a* of the printhead 22 to the surface of the platen 25, or the distance from the nozzle face 22*a* to the surface of the paper P conveyed over the platen 25. Both of these distances are called the platen gap in this embodiment of the invention.

In this embodiment the platen 25 is mounted on the print unit frame 51 side at a fixed position on the vertical axis Z. The platen gap adjustment mechanism 70 moves the two first and second guide rails 57, 58 positioned above the platen 25 on the vertical axis Z, and thereby increases or decreases the platen gap. The vertical axis Z is therefore the gap adjustment direction. Alternatively, the first and second guide rails 57, 58 could be fixed on the print unit frame 51 side, and the platen 25 moved on the vertical axis Z to adjust the platen gap.

Figure 8:
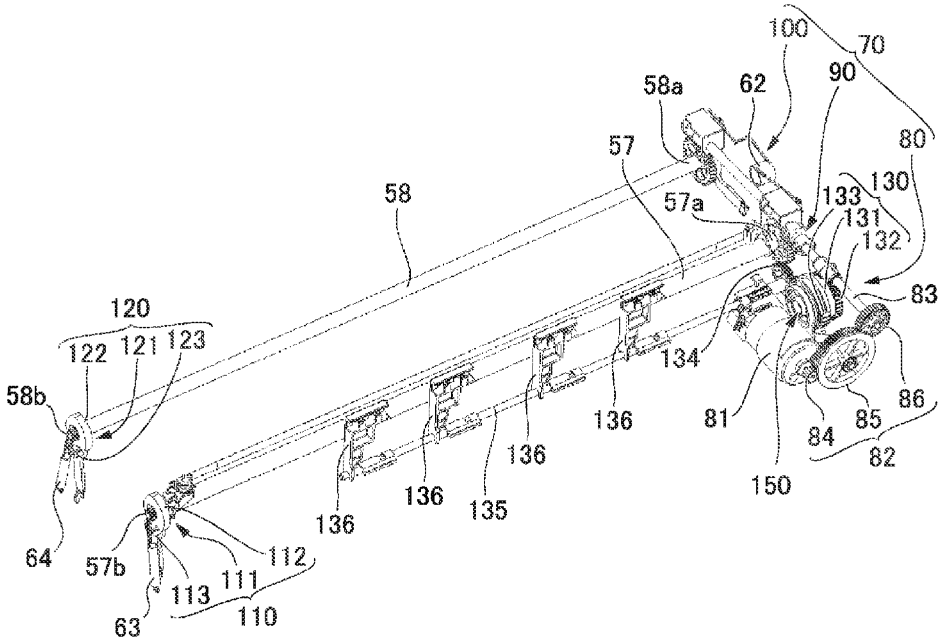
FIG. 8 is an oblique view of the platen gap adjustment mechanism of the printer from the back.
Figure 9:
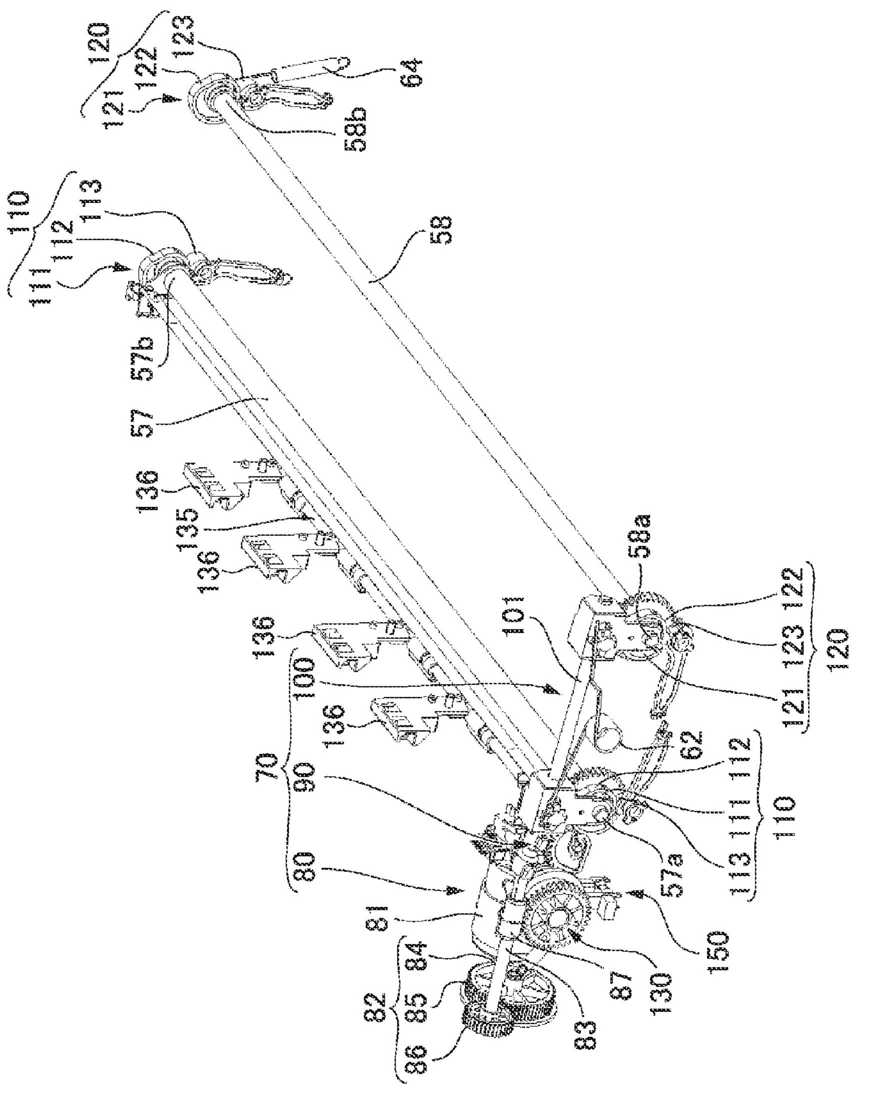
FIG. 9 is an oblique view of the platen gap adjustment mechanism from the front.

FIG. 8 and FIG. 9 are oblique views showing the main part of the platen gap adjustment mechanism 70 removed from the print mechanism unit 50. These figures show the main parts of the platen gap adjustment mechanism 70 from different directions. The platen gap adjustment mechanism 70 includes a stationary part 80, a movable part 100, a universal joint 90, and rotary cam mechanisms 110, 120.

The stationary part 80 includes stationary-side components mounted on the print mechanism unit 50 side. The movable part 100 includes the first and second guide rails 57, 58 and components that can move on the vertical axis Z. The universal joint 90 transfers torque from the stationary part 80 to the movable part 100.

A reference position detection unit 150 that detects the reference position (origin) of the rotary member as the platen gap adjustment reference is also included in the platen gap adjustment mechanism 70.

The stationary part 80 is disposed on the back side of the rear frame 56 at the end on the side frame 53 side. The reference position detection unit 150 is disposed to the stationary part 80.

The movable part 100 is disposed along the inside surface 53*d* of the side frame 53. The movable part 100 includes a rotary transfer mechanism that transfers rotation to the first and second guide rails 57, 58. The rotary transfer mechanism in this example is a synchronous rotary mechanism that synchronously rotates the first and second guide rails 57, 58.

The rotary cam mechanisms 110, 120 are each disposed to both the inside surface of side frame 53 and the inside surface of side frame 54. The rotary cam mechanisms 110, 120 are cam mechanisms that convert rotation of the first and second guide rails 57, 58 to movement of the first and second guide rails 57, 58 in the gap adjustment direction.

Figure 10:
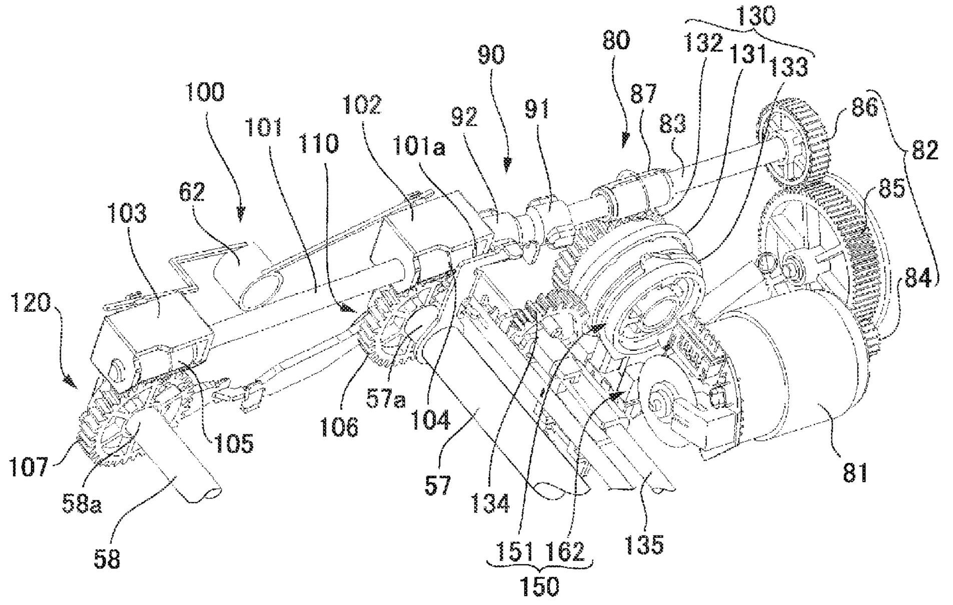
FIG. 10 is a partial oblique view showing a main part of the platen gap adjustment mechanism.
Figure 11:
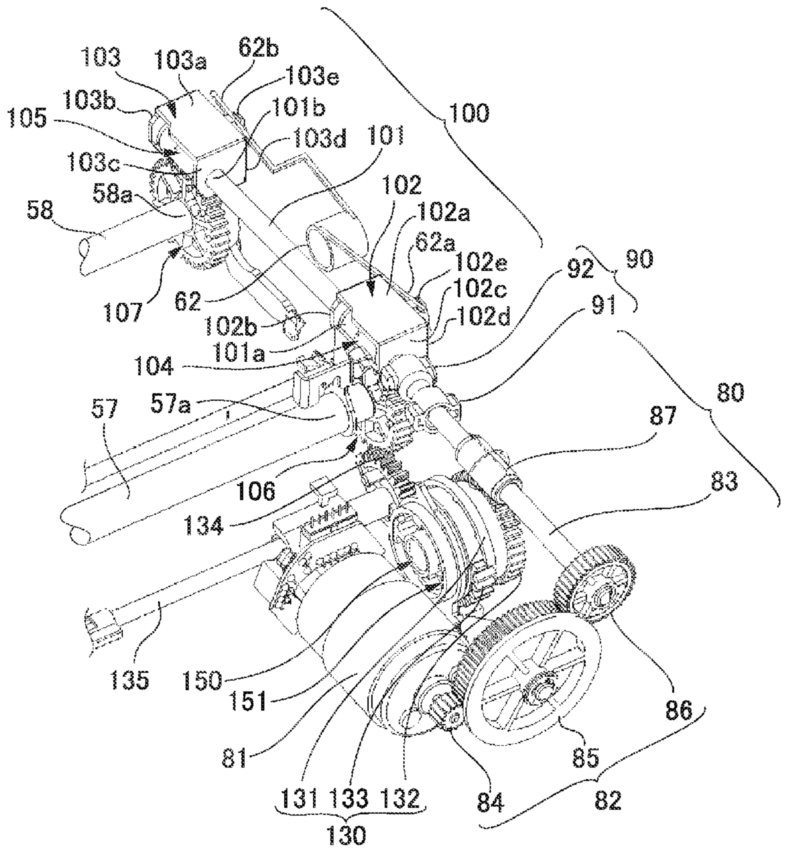
FIG. 11 is a partial oblique view showing a main part of the platen gap adjustment mechanism.
Figure 12:
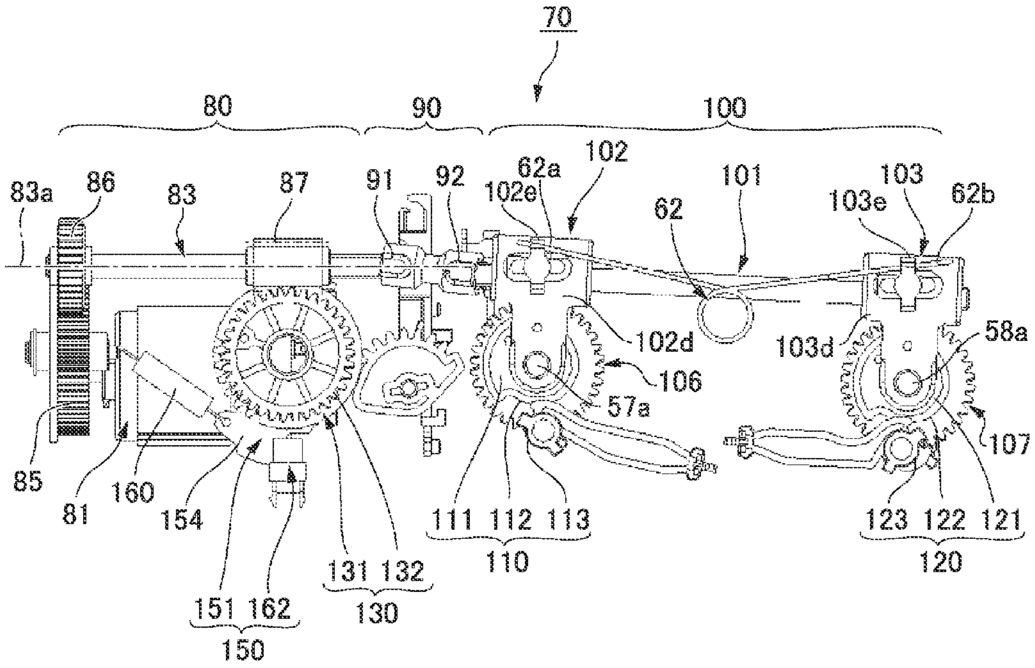
FIG. 12 is a partial side view showing a main part of the platen gap adjustment mechanism.

FIG. 10, FIG. 11, and FIG. 12 are, respectively, an oblique view from the front, an oblique view from the back, and a side view from the side of the printer width showing main parts of the platen gap adjustment mechanism 70. The configuration of the platen gap adjustment mechanism 70 is described in detail below with reference to FIG. 8 to FIG. 12.

Stationary-Side Part

The stationary part 80 of the platen gap adjustment mechanism 70 includes a motor 81 as a rotary drive source, a power transfer gear train 82, and a stationary-side rotary shaft 83. These parts are fastened to the print unit frame 51 side through a unit case 88 (see FIG. 13A, FIG. 13B and FIG. 14 described below). The motor 81 is disposed horizontally facing the back of the printer. The stationary-side rotary shaft 83 is disposed near the motor 81 with the axis of rotation 83*a* extending horizontally in the front-back direction (on the longitudinal axis Y) of the printer. The power transfer gear train 82 includes a pinion 84 fixed to the output shaft of the motor 81, an intermediate transfer gear 85 meshed with the pinion 84, and a shaft-side transfer gear 86 meshed with the intermediate transfer gear 85. The shaft-side transfer gear 86 is fixed to the back end of the stationary-side rotary shaft 83.

A worm 87 is formed coaxially to the stationary-side rotary shaft 83 at the middle in the axial direction. Below the worm 87 is a compound gear 130 with its axis of rotation on the transverse axis X perpendicular to the stationary-side rotary shaft 83.

The compound gear 130 includes a cylindrical body 131, a worm wheel 132 meshed with the worm 87, and an intermittent external gear 133 with teeth formed in a specific angular range of the circumference.

An annular detection flag disc 151 is disposed coaxially to the compound gear 130 and rotates freely relative to the compound gear 130. The detection flag disc 151 is part of the reference position detection unit 150 described below.

The reference position detection unit 150 detects the reference position in one revolution of the compound gear 130, which is a rotary member, during the printer 1 initialization operation. Driving the motor 81 is controlled and the platen gap is adjusted based on this reference position.

The intermittent external gear 133 of the compound gear 130 can mesh with an adjacently disposed fan-shaped external gear 134. The fan-shaped external gear 134 is a gear with external teeth formed in an arc of a specific angle. The intermittent external gear 133 meshes with the fan-shaped external gear 134 in a specific angle of rotation within one revolution of the compound gear 130. The fan-shaped external gear 134 is fixed to the end of a rotary shaft 135 extending horizontally on the transverse axis X behind the first guide rail 57.

Rotatable roller support arms 136 are disposed to the rotary shaft 135 at a specific interval along the axial direction. The roller support arms 136 support the follower roller 18 that is pressed against the conveyance roller 17 (see FIG. 3). When the compound gear 130 turns in the forward-reverse direction in the range of one revolution, the rotary shaft 135 turns within a specific angular range in the forward-reverse direction. The follower roller 18 supported by the roller support arms 136 that pivot in unison with the rotary shaft 135 thus moves between the position pressed against the conveyance roller 17, and a release position separated from the conveyance roller 17.

Universal Joint

The universal joint 90 includes a stationary-side coupling part 91 and a movable-side coupling part 92. The stationary-side coupling part 91 is connected to the end of the stationary-side rotary shaft 83 of the stationary part 80 toward the back of the printer. The movable-side coupling part 92 of the universal joint 90 passes with sufficient play through a through-hole in the rear frame 56, and protrudes toward the movable part 100 on the side toward the front of the printer.

Movable Part

The movable part 100 can move in the gap adjustment direction (the vertical axis Z) guided by the side frames 53, 54. As will be understood from FIG. 6 and FIG. 7, guide holes 53*a*, 53*b* that extend parallel on the vertical axis Z, which is the gap adjustment direction, are formed in the side frame 53. One end 57*a*, 58*a* of the first and second guide rails 57, 58 protrudes through to the outside slidably in the guide holes 53*a*, 53*b*. A pair of guide holes (not shown in the figure) are likewise formed in the side frame 54 on the opposite side, and the other end 57*b*, 58*b* (FIG. 8, FIG. 9) of the first and second guide rails 57, 58 protrudes through to the outside slidably in these guide holes.

The first and second guide rails 57, 58 can slide on the vertical axis Z guided by the guide holes 53*a*, 53*b*. As shown in FIG. 6 to FIG. 10, a torsion spring 62 is attached to the outside surface 53*c* of the side frame 53 at a position above the drive transfer mechanism 140. The one end 57*a*, 58*a* of the first and second guide rails 57, 58 is constantly urged down on the vertical axis Z by the torsion spring 62.

As shown in FIG. 8 and FIG. 9, tension springs 63, 64 are mounted between the other end 57*b*, 58*b* of the first and second guide rails 57, 58 and a lower position on the side frame 54. The other ends 57*b*, 58*b* are thus constantly urged down on the vertical axis Z.

The movable part 100 has a movable-side rotary shaft 101 extending horizontally on the longitudinal axis Y. The movable-side rotary shaft 101 is located above the side frame 53 side ends 57*a*, 58*a* of the first and second guide rails 57, 58, and extends horizontally on the longitudinal axis Y along the inside surface 53*d* of the side frame 53. More specifically, the movable-side rotary shaft 101 extends perpendicularly to the first and second guide rails 57, 58. The opposite ends 101*a*, 101*b* of the movable-side rotary shaft 101 are supported freely rotatably by a first bracket 102 and a second bracket 103. The first and second brackets 102, 103 hold the movable-side rotary shaft 101 and the first and second guide rails 57, 58 with a specific gap therebetween (in a specific position relative to each other).

As shown in FIG. 11, the first bracket 102 has a top plate 102*a*, front and back end plates 102*b*, 102*c*, and a side plate 102*d*. The movable-side rotary shaft 101 is supported freely rotatably by the front and back end plates 102*b*, 102*c*. The end 57*a* of the first guide rail 57 passes rotatably through the bottom part of the side plate 102*d*.

The second bracket 103 is configured the same way with a top plate 103*a*, front and back end plates 103*b*, 103*c* that support the movable-side rotary shaft 101 freely rotatably, and a side plate 103*d* through which the end 58*a* of the second guide rail 58 passes rotatably.

A spring catch 102*e*, 103*e* is formed at a place near the top of the side plate 102*d*, 103*d* of the first and second brackets 102, 103, respectively. The opposite ends 62*a*, 62*b* of the torsion spring 62 mounted on the outside side of the side frame 53 engage the tops of the spring catches 102*e*, 103*e*. The movable part 100 is constantly urged down on the vertical axis Z by the spring force of the torsion spring 62.

The end 101*a* of the movable-side rotary shaft 101 on the back side of the printer is connected to the movable-side coupling part 92 of the universal joint 90. Rotation from the stationary-side rotary shaft 83 is transferred through the universal joint 90 to the movable-side rotary shaft 101. The universal joint 90 enables the movable-side rotary shaft 101 to move within a specific range on the vertical axis Z, which is the gap adjustment direction, relative to the stationary-side rotary shaft 83. The movable-side rotary shaft 101 can also move within a specific range on the transverse axis X relative to the stationary-side rotary shaft 83. As will be understood from FIG. 5, the movable-side rotary shaft 101 is disposed horizontally on the longitudinal axis Y at a position offset slightly to the outside on the transverse axis X from the stationary-side rotary shaft 83.

As will be understood from FIG. 10 and FIG. 11, a first worm 104 (first drive-side gear) is formed in unison with the outside surface of the movable-side rotary shaft 101 on the end 101*a* toward the back of the printer. A second worm 105 (second drive-side gear) is also formed on the outside surface of the other end 101*b*. The first and second worms 104, 105 are identical. The first and second worms 104, 105 are covered on three sides, the top and front and back, by the first and second brackets 102, 103.

The first worm 104 meshes with a first worm wheel 106 (first driven-side gear) fastened coaxially to the end 57*a* of the first guide rail 57. The second worm 105 likewise meshes with a second worm wheel 107 fastened coaxially to the end 58*a* of the second guide rail 58. The first and second worm wheels 106, 107 are identical worm wheels.

Rotation of the movable-side rotary shaft 101 is transferred through the first and second worms 104, 105 and the first and second worm wheels 106, 107 to the first and second guide rails 57, 58. The first and second guide rails 57, 58 are synchronously driven rotationally. A synchronous rotary mechanism that synchronously drives the first and second guide rails 57, 58 rotationally is thus configured by the movable-side rotary shaft 101, the first and second worms 104, 105, and the first and second worm wheels 106, 107.

Rotary Cam Mechanism

As shown in FIG. 8, FIG. 9, and FIG. 12, identically configured rotary cam mechanisms 110 are assembled to each end 57*a*, 57*b* of the first guide rail 57. Identically configured rotary cam mechanisms 120 are likewise assembled to each end 58*a*, 58*b* of the second guide rail 58. The rotary cam mechanism 110 and the rotary cam mechanism 120 are identically configured rotary cam mechanisms.

The rotary cam mechanism 110 is a conversion mechanism that converts rotation of the first guide rail 57 to movement of the first guide rail 57 in the gap adjustment direction, that is, the vertical axis Z. The rotary cam mechanism 120 is likewise a conversion mechanism that converts rotation of the second guide rail 58 to movement of the second guide rail 58 in the gap adjustment direction.

The rotary cam mechanism 110 on the end 57*a* side of the first guide rail 57 has a rotary cam 111 fixed to the shaft end 57*a*. An external cam surface 112 is formed on the rotary cam 111. A cam follower 113 that slidably contacts the external cam surface 112 from below is disposed to the inside surface of the side frame 53. The shape of the external cam surface 112 is formed so that the point of contact between the external cam surface 112 and the cam follower 113 moves in the gap adjustment direction (vertical axis Z) in conjunction with rotation of the rotary cam 111. An identically configured rotary cam mechanism 110 is disposed to the other end 57*b* of the first guide rail 57.

As will be understood from FIG. 12, the external cam surface 112 is shaped so that the distance from the center of rotation (the axis of rotation of the first guide rail 57) increases gradually through a specific angular range along the outside surface. When the rotary cam 111 turns clockwise in the figure from the phase of rotation shown in FIG. 12, the external cam surface 112 contacts the cam follower 113. As the rotary cam 111 continues to turn, the external cam surface 112 is pushed up by the stationary cam follower 113. As a result, the end 57*a* of the first guide rail 57 moves up.

As shown in FIG. 8, FIG. 9, and FIG. 12, the rotary cam mechanism 120 disposed on the end 58*a* of the second guide rail 58 is configured identically to the rotary cam mechanism 110 described above, and has a rotary cam 121, an external cam surface 122 formed on the rotary cam 121, and a cam follower 123. The rotary cam mechanism 120 disposed on the other shaft end 58*b* is identically configured.

The rotary cam 121 and cam follower 123 are disposed in the same phase of rotation as the rotary cam 111 and cam follower 113 of the rotary cam mechanism 110. Therefore, when the first and second guide rails 57, 58 are synchronously turned, the rotary cam mechanisms 110, 120 turn in the same phase of rotation, and the ends 57*a*, 57*b* of the first guide rail 57 and the ends 58*a*, 58*b* of the second guide rail 58 are moved the same amount on the vertical axis Z, which is the gap adjustment direction. The movable part 100 therefore moves on the vertical axis Z while remaining substantially horizontal. The printhead 22 on the movable side therefore moves relative to the platen 25 on the stationary side, and the platen gap is adjusted.

Reference Position Detection Unit

Figure 13A:
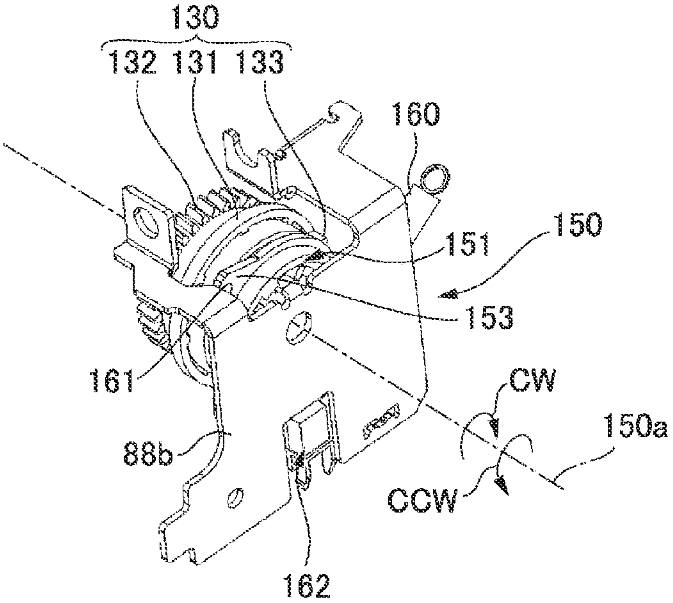
FIG. 13A is a partial oblique view of the reference position detection unit of the platen gap adjustment mechanism.
Figure 13B:
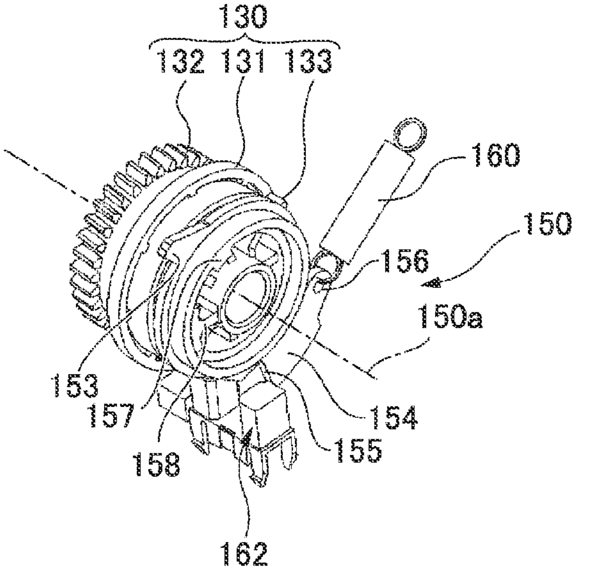
FIG. 13B is an oblique view of the reference position detection unit with the unit frame removed.
Figure 14:
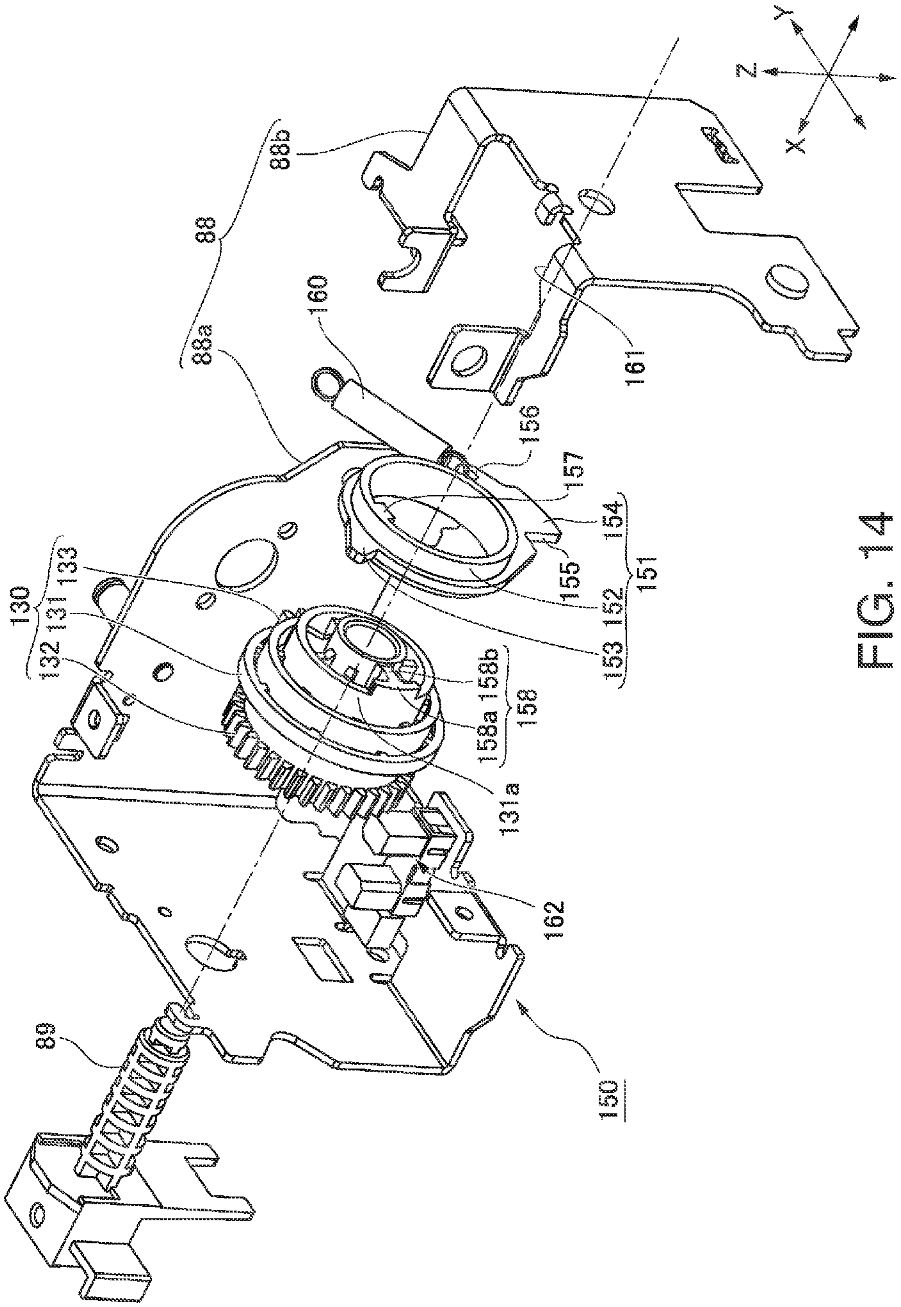
FIG. 14 is a partial oblique view of the reference position detection unit.
Figure 15:
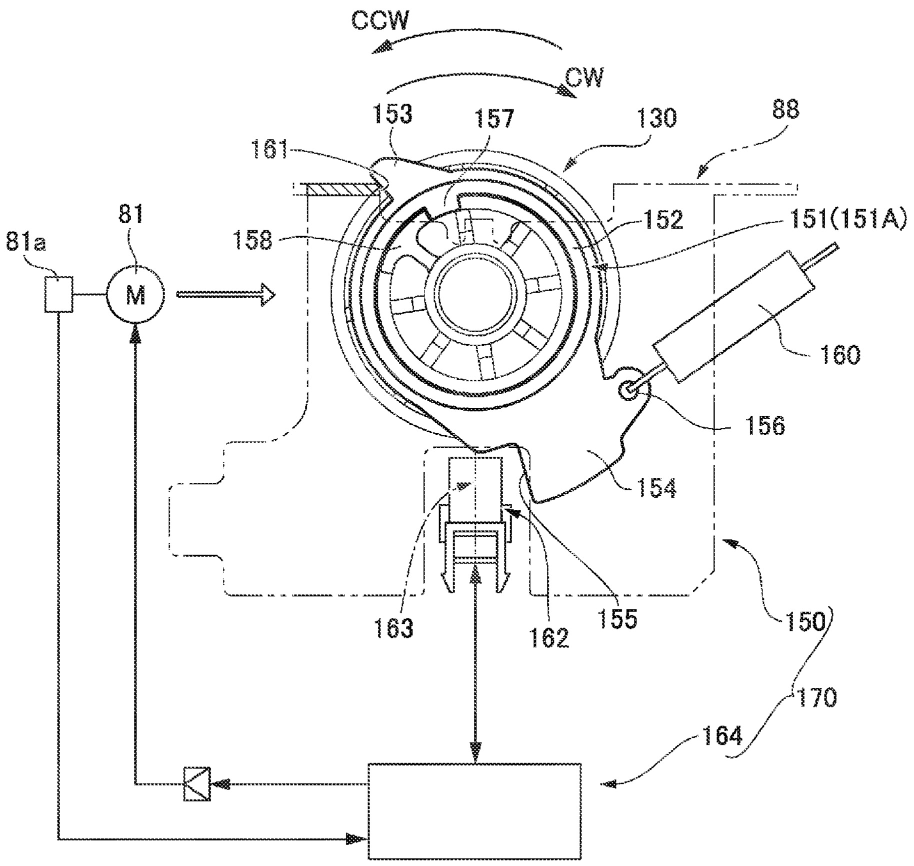
FIG. 15 describes the operation of the reference position detection device of the platen gap adjustment mechanism.

The configuration of the reference position detection unit 150 of the platen gap adjustment mechanism 70 is described next referring mainly to FIG. 13A, FIG. 13B, FIG. 14, and FIG. 15. FIG. 13A is an oblique view of the reference position detection unit 150, and FIG. 13B is an oblique view of the reference position detection unit 150 with the unit frame removed. FIG. 14 is an exploded oblique view of the reference position detection unit 150. FIG. 15 describes operation of the reference position detection device of a rotary mechanism including the reference position detection unit 150.

The reference position detection unit 150 is for detecting the reference position, which is the rotational angle position used as a control reference within one revolution of the compound gear 130. As will be understood from FIG. 14, the compound gear 130 is rotatably supported by a shaft 89 extending between the case frame 88*a* and the case cover 88*b* of the unit case 88 of the stationary part 80. A cylinder 131*a* that protrudes to the inside is formed to the inside end on the transverse axis X of the compound gear 130. The detection flag disc 151 is coaxially fit rotatably forward and reverse to the outside surface of the cylinder 131*a*. Below, the direction of rotation denoted by arrow CW is first direction of rotation CW, and the direction of rotation denoted by arrow CCW is second direction of rotation CCW.

The detection flag disc 151 has an annular body 152, a contact finger 153 formed on the outside of the annular body 152, and a flag 154 that is the detection tab. The contact finger 153 is a flat, trapezoidal protrusion of a constant thickness protruding to the outside from the outside surface of the annular body 152. The flag 154 is a tab of a constant thickness and substantially constant width protruding to the outside from the outside surface of the annular body 152. The flag 154 is disposed to a position on the annular body 152 substantially diametrically opposite the contact finger 153.

The edge 155 of the flag 154 in the first direction of rotation CW side is a straight edge extending radially to the annular body 152. A hole 156 for mounting a spring is formed in the end on the opposite side of the edge 155 of the flag 154. One end of a tension spring 160 used as an urging member is mounted in this hole 156. The tension spring 160 is disposed extending to the outside on the transverse axis X, and the opposite end of the spring is mounted on the unit case 88 at a position (not shown in the figure) on the outside on the transverse axis X. The tension spring 160 used as an urging member applies a constant urging force causing the detection flag disc 151 to rotate in the second direction of rotation CCW on the axis of rotation 150*a*.

As will be understood from FIG. 13A and FIG. 15, a stop 161 functioning as a motion limiter that the contact finger 153 can contact is formed on the cover 88*b* part of the unit case 88. The limit of detection flag disc 151 movement in the second direction of rotation CCW is determined by the stop 161. This stop 161 is positioned above the detection flag disc 151 slightly to the second direction of rotation CCW side of the axis of rotation 150*a*. The detection flag disc 151 is disposed so that the contact finger 153 is positioned on the first direction of rotation CW side of the stop 161. Therefore, when the detection flag disc 151 rotates in the second direction of rotation CCW, the contact finger 153 contacts the stop 161.

The rotational position of the detection flag disc 151 at which the contact finger 153 contacts the stop 161 is called the first position 151A. The stop 161 prevents the detection flag disc 151 from rotating past this first position 151A in the second direction of rotation CCW. The detection flag disc 151 can rotate in the opposite direction, first direction of rotation CW, against the urging force of the tension spring 160.

A flag-side stop 157 that protrudes toward the center from the inside surface is disposed to the annular body 152 of the detection flag disc 151. The flag-side stop 157 is formed at a position substantially on the inside side of the contact finger 153 of the annular body 152.

A gear-side stop 158 is formed on the cylindrical body 131 side of the compound gear 130 as a rotating-side stop that can engage the flag-side stop 157. The gear-side stop 158 includes a curved part 158*a* along a specific angle of the cylindrical body 131, and a rib 158*b* extending radially from the curved part 158*a*, protruding a specific amount in line with the axis of rotation. The flag-side stop 157 and the curved part 158*a* of the gear-side stop 158 are formed at the same radial position from the axis of rotation 150*a*. Therefore, when the compound gear 130 and the detection flag disc 151 rotate relative to each other around the axis of rotation 150*a*, the gear-side stop 158 and the flag-side stop 157 can engage.

A detector 162 that detects the flag 154 is disposed below the detection flag disc 151. The detector 162 in this example is a photocoupler. As indicated by the dot-dash line in FIG. 15, the detection position 163 of the detector 162 is on a line through the axis of rotation 150*a*. When the flag 154 is at the detection position 163, for example, the detector 162 outputs an ON detection signal indicating detection of the flag 154, and outputs the detection signal OFF when the flag 154 is not in this position. When the detection flag disc 151 turns in the first direction of rotation CW, the detection signal changes from OFF to ON when edge 155 passes the detection position 163. Rotation of the detection flag disc 151 stops after the edge 155 passes the detection position 163 in the first direction of rotation CW. When the detection flag disc 151 then rotates in the opposite second direction of rotation CCW, the detection signal changes from ON to OFF when edge 155 again passes the detection position 163.

As shown in FIG. 15, the reference position detection device 170 of the compound gear 130 is embodied by the reference position detection unit 150 described above and the printer 1 control unit 164. During the printer initialization operation, for example, the control unit 164 drives the rotary mechanism of the platen gap adjustment mechanism 70 and sets the reference position. More specifically, the motor 81 operates to turn the compound gear 130, and based on the output of a motor encoder 81*a* disposed to the motor 81 and the detection signal from the detector 162, the control unit 164 sets the reference position within one revolution of the compound gear 130. After setting the reference position, the control unit 164 controls driving the motor 81 based on an external command and based on the set reference position to adjust the platen gap to the specified gap.

Reference Position Setting Operation and Platen Gap Adjustment Operation

Figure 16:
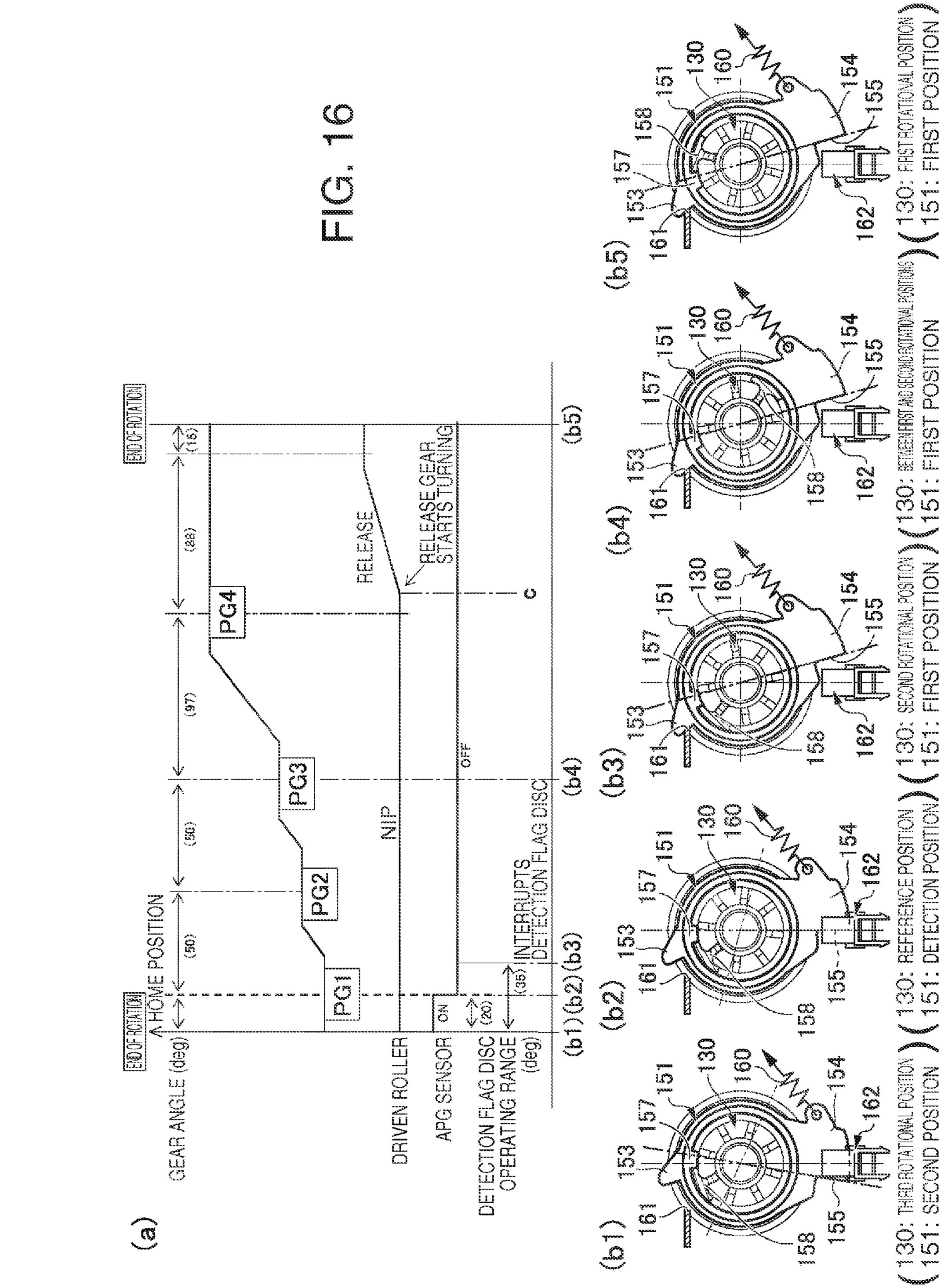
FIG. 16 is a timing chart of platen gap adjustment mechanism operation.
Figure 17:
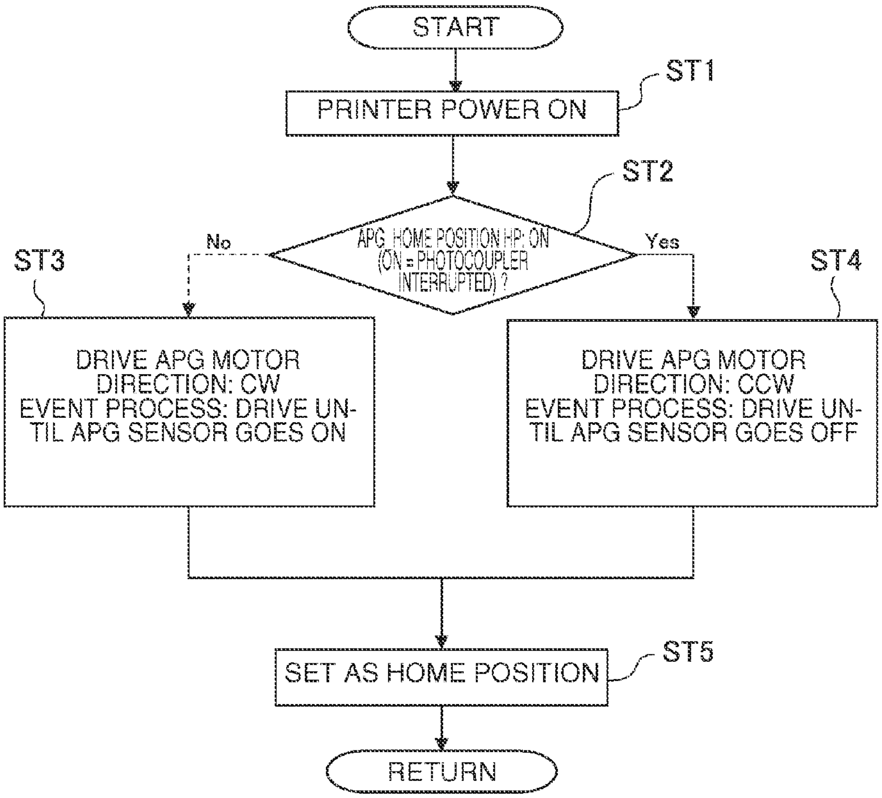
FIG. 17 is a basic flow chart of the reference position setting operation.

FIG. 16 is a timing chart of the platen gap adjustment operation, and FIG. 17 is a basic flow chart of the operation setting the reference position.

The operation setting the reference position of the platen gap adjustment mechanism 70 is described next with reference to these figures. First, the compound gear 130 can rotate within the rotational range of one revolution in the first and second directions of rotation CW, CCW from the first rotational position shown in FIG. 16 (*b*5), past the second rotational position shown in FIG. 16 (*b*3) and the reference position shown in FIG. 16 (*b*2), to the third rotational position shown in FIG. 16 (*b*1).

The detection flag disc 151 can rotate in conjunction with rotation of the compound gear 130 through the angular range from the first position shown in FIG. 16 (*b*5) to the second position shown in FIG. 16 (*b*1). More specifically, the detection flag disc 151 engages the compound gear 130 that rotates from the second rotational position shown in FIG. 16 (*b*3) to the third rotational position shown in FIG. 16 (*b*1), and rotates from the first position shown in FIG. 16 (*b*3) to the second position shown in FIG. 16 (*b*1). Following the compound gear 130 rotating from the third rotational position shown in FIG. 16 (*b*1) to the second rotational position shown in FIG. 16 (*b*3), the detection flag disc 151 rotates from the second position shown in FIG. 16 (*b*1) to the first position shown in FIG. 16 (*b*3).

The rotational position of the detection flag disc 151 when the compound gear 130 passes the reference position shown in FIG. 16 (*b*2) is the detection position of the detection flag disc 151, and the position where the edge 155 of the flag 154 passes the detection position of the detector 162.

The flag moving mechanism that causes the detection flag disc 151 to rotate in conjunction with rotation of the compound gear 130 includes the stop 161 that defines the first position of the detection flag disc 151, the tension spring 160 that urges the detection flag disc 151 from the second position side toward the first position, the gear-side stop 158 formed on the compound gear 130, and the flag-side stop 157 formed on the detection flag disc 151.

The operation described below starts, for example, with the detection flag disc 151 urged by the tension spring 160 to the first position contacting the stop 161 as shown in FIG. 16 (*b*3). When the printer 1 power turns ON in this position (FIG. 17, step ST1), the control unit 164 executes the reference position setting operation (detection operation) of the platen gap adjustment mechanism 70.

In this operation, the control unit 164 first determines if the detection signal from the detector 162 is ON (emitter is interrupted) (FIG. 17, step ST2). As shown in FIG. 16 (*b*3), when the detection flag disc 151 is in the first position contacting the stop 161, the edge 155 of the flag 154 is positioned away from the detection position 163 in the second direction of rotation CCW, and the detection signal is OFF. The detection flag disc 151 is also constantly urged by the tension spring 160 in the second direction of rotation CCW.

The control unit 164 drives the motor 81 to turn the compound gear 130 in the first direction of rotation CW (FIG. 17, step ST2 to step ST3). When the compound gear 130 turns in the first direction of rotation CW, the detection flag disc 151 engaged therewith also turns in the first direction of rotation CW. When the detection flag disc 151 turns in the first direction of rotation CW, the edge 155 of the flag 154 of the detection flag disc 151 passes the detection position 163 of the detector 162. FIG. 16 (*b*2) shows the detection flag disc 151 in the detection position when the edge 155 passes the detection position 163. The detection signal goes from OFF to ON at this time. The control unit 164 therefore sets the rotational position of the compound gear 130 at this time as the reference position (home position) of the rotary mechanism of the platen gap adjustment mechanism 70 (FIG. 17, step ST5).

However, if in step ST2 the detection signal is ON, the reference position is set as described below. In this example, the detection flag disc 151 is at the second position rotated a specific angle first direction of rotation CW from the stop 161 as shown in FIG. 16 (*b*1). At this time, the flag 154 of the detection flag disc 151 is at the detection position 163 of the detector 162 in the direction of rotation. The detection flag disc 151 also remains engaged with the compound gear 130 by the tension spring 160 at this time.

In this event, the control unit 164 drives the motor 81 to turn the compound gear 130 in the second direction of rotation CCW (FIG. 17, step ST2 to step ST4). When the compound gear 130 turns in the second direction of rotation CCW, the detection flag disc 151 engaged with the compound gear 130 by the urging force of the tension spring 160 follows the compound gear 130 and rotates in the second direction of rotation CCW. When the detection flag disc 151 rotates in the second direction of rotation CCW, the detection flag disc 151 passes the detection position shown in FIG. 16 (*b*2), and the edge 155 of the flag 154 passes the detection position 163 of the detector 162. The detection signal therefore changes from ON to OFF. The control unit 164 therefore sets the rotational position of the compound gear 130 at this time as the reference position (home position) of the rotary mechanism of the platen gap adjustment mechanism 70 (FIG. 17, step ST5).

The range of the rotational angle of the detection flag disc 151 of the reference position detection unit 150 in the reference position setting operation is thus the angular range in which the edge 155 of the flag 154 passes the detection position 163 in the first direction of rotation CW or the second direction of rotation CCW. More specifically, the range of rotation is at most the angle from the first position shown in FIG. 16 (*b*3) to the second position shown in FIG. 16 (*b*1). This angle is extremely small compared to the rotational angle range of the compound gear 130, which is substantially one revolution from the first rotational position (FIG. 16 (*b*5)) to the third rotational position (FIG. 16 (*b*1)). Little space is therefore required for movement of the flag 154 and contact finger 153 of the detection flag disc 151 protruding from the outside of the compound gear 130.

After the reference position is set as described above, the control unit 164 can adjust the platen gap according to an external command, for example. As shown in FIG. 16 (*a*), the control unit 164 causes the compound gear 130 to rotate in the second direction of rotation CCW toward the first position. Rotation of the stationary-side rotary shaft 83 that rotationally drives the compound gear 130 in the second direction of rotation CCW is transferred to the movable part 100 side, and the first and second guide rails 57, 58 move away from the platen 25. The platen gap changes in four stages from gap PG1 to PG4 as shown in FIG. 16 (*a*) according to the angle of rotation in the second direction of rotation CCW from the reference position.

When the compound gear 130 turns in the second direct ion of rotation CCW, the detection flag disc 151 turns in the same direction in unison with the compound gear 130 due to the urging force of the tension spring 160 to the first position in contact with the stop 161. Rotation in the second direction of rotation CCW stops when the detection flag disc 151 contacts the stop 161. Thereafter, only the compound gear 130 turns in the second direction of rotation CCW, and the detection flag disc 151 is held at the first position disengaged from the compound gear 130.

When the compound gear 130 rotates to the first rotational position, which is the limit in the second direction of rotation CCW, the gear-side stop 158 contacts the opposite side of the flag-side stop 157 of the detection flag disc 151. The compound gear 130 thus rotates through an angular range of less than one revolution from the rotational position shown in FIG. 16 (*b*1) to the rotational position shown in FIG. 16 (*b*5), and the platen gap changes accordingly.

As described with reference to FIG. 8 and FIG. 9, rotation of the compound gear 130 is transferred through the intermittent external gear 133 and the fan-shaped external gear 134 to the rotary shaft 135. The follower roller 18 is supported on the roller support arms 136 attached to the rotary shaft 135. As shown in FIG. 16 (*a*), when the compound gear 130 turns a specific angle in the first direction of rotation CW from the reference position, the rotary shaft 135 starts turning (point c). As a result, the follower roller 18 in the nip position pressed against the conveyance roller 17 moves toward the release position separated from the conveyance roller 17, and changes to the release position. When the compound gear 130 turns in the opposite direction, the follower roller 18 can return from the release position to the nip position. Releasing the follower roller 18 occurs in an angular range outside the rotational angle range for platen gap adjustment. More specifically, the angular range of the compound gear 130 from point b1 to point c in FIG. 16 (*a*) is the platen gap adjustment range, and the follower roller 18 is released by rotation of the compound gear 130 past point c.

EFFECT OF THE INVENTION

In the platen gap adjustment mechanism 70 described above, rotation of the motor 81 of the stationary part 80 is transferred from the stationary-side rotary shaft 83 through the universal joint 90 to the movable-side rotary shaft 101 of the movable part 100. In the movable part 100, the synchronous rotary mechanism that synchronously drives the first and second guide rails 57, 58 is embodied by the movable-side rotary shaft 101, first and second worms 104, 105, and first and second worm wheels 106, 107. Compared with a synchronous rotary mechanism comprising a gear train of plural spur gears between the first and second guide rails 57, 58, the synchronous rotary mechanism of the invention can be configured using fewer parts and consumes less space.

The first and second worms 104, 105 are formed in unison with the movable-side rotary shaft 101 and therefore rotate perfectly synchronized with the movable-side rotary shaft 101. Because the first and second worms 104, 105 also mesh with the first and second worm wheels 106, 107 disposed on a perpendicular axis of rotation, there is less backlash compared with meshed spur gears on parallel axes of rotation. More particularly, because this embodiment uses cylindrical worm gear pairs, there is zero backlash. The platen gap can therefore be adjusted with good precision because the first and second guide rails 57, 58 can be synchronously turned with good precision.

A high speed reduction ratio comparable to a gear train using numerous spur gears can also be achieved by using a two-gear configuration consisting of a worm and a worm wheel. Because fewer gear are therefore required to achieve a specific speed reduction ratio, a small, compact platen gap adjustment mechanism 70 can be achieved.

The first and second worms 104, 105 and first and second worm wheels 106, 107 also mesh on perpendicular axes of rotation. Force moving the first and second worm wheels 106, 107 in the direction of rotation is also not applied from the first and second worms 104, 105, the drive gears, to the first and second worm wheels 106, 107, the driven gears. In other words, the force moving the first and second guide rails 57, 58 in the gap adjustment direction is not applied. Unlike a geared transfer mechanism composed of meshed spur gears, great force in the gap adjustment direction is not applied to the first and second guide rails 57, 58. Small springs can also be used for the torsion spring 62 and the tension springs 63, 64 that prevent the first and second guide rails 57, 58 from moving in the gap adjustment direction.

The first and second guide rails 57, 58 also turn synchronously with good precision which this platen gap adjustment mechanism 70. There is therefore no need to allow for play in the rotary cam mechanisms 110, 120 that convert rotation of the first and second guide rails 57, 58 to movement of these shafts in the gap adjustment direction in order to absorb deviation in the synchronous rotation of the first and second guide rails 57, 58. A small diameter is therefore sufficient in the external cam surfaces 112, 122 of the rotary cams 111, 121. Because small diameter rotary cams 111, 121 can therefore be used, the size of the platen gap adjustment mechanism 70 can also be reduced. The platen gap can therefore be adjusted quickly and efficiently.

The stationary-side rotary shaft 83 of the stationary part 80 and the movable-side rotary shaft 101 of the movable part 100 are connected by a universal joint 90. Torque from the stationary-side rotary shaft 83 to the movable-side rotary shaft 101 is transferred even if the movable-side rotary shaft 101 is displaced in the gap adjustment direction. When rotation is transferred from the stationary-side rotary shaft 83 to the movable-side rotary shaft 101 by meshing spur gears, the movable-side rotary shaft 101 cannot move greatly in the gap adjustment direction because of the need to keep the spur gears meshed. By using a universal joint, however, the range of movement can be increased for the movable-side rotary shaft 101 compared with the related art, and a platen gap adjustment mechanism enabling a large gap adjustment can be easily achieved.

By using a universal joint 90, the movable-side rotary shaft 101 of the movable part 100 can also be offset on the transverse axis X from the stationary-side rotary shaft 83 of the stationary part 80. Greater freedom is therefore possible in the layout of the platen gap adjustment mechanism 70.

The movable part 100, and the rotary cam mechanisms 110, 120 of the platen gap adjustment mechanism 70 are disposed along the inside surface 53*d* of the side frame 53. The drive transfer mechanism 140 for media conveyance is disposed to the outside surface of the side frame 53. By thus using space on the inside of the printer side frame 53, the platen gap adjustment mechanism 70 can be disposed to the printer side frames 53, 54 on either side of the main conveyance path 13 without being restricted by the drive transfer mechanism 140. Because placement of the platen gap adjustment mechanism 70 is thus not limited by the drive transfer mechanism 140 for media conveyance, and the platen gap adjustment mechanism 70 can be disposed on either side of the paper conveyance path, greater freedom is achieved in the layout of the platen gap adjustment mechanism 70.

Because the movable part 100 of the platen gap adjustment mechanism 70 is disposed on the inside of the side frame 53, a part of the movable part 100 can be used as a contact member that can contact the head carriage 59. A contact member can alternatively be disposed to the movable part 100.

For example, an edge of the first and second brackets 102, 103 of the movable part 100 on the inside on the transverse axis X can be used as a stop that contacts the head carriage 59. More specifically, if when moving to the side of the side frame 53 the head carriage 59 moves beyond a specific limit to the side frame 53 side, a side part of the head carriage 59 could be made to contact a stop formed on the first and second brackets 102, 103.

Next, the reference position can be set in the reference position detection unit 150 of the platen gap adjustment mechanism 70 by rotating the detection flag disc 151 within a small angular range from a first position (FIG. 16 (*b*5)) to a second position (FIG. 16 (*b*3)). Compared with using a detection flag disc that turns substantially one revolution with the compound gear 130 (rotary member), little space is needed for movement of the flag of the detection flag. A compact reference position detection unit 150 with a small outside diameter can therefore be achieved.

In this embodiment of the invention the detection flag disc 151 rotates on its axis of rotation 150*a*. Alternatively, the detection flag disc 151 could be moved reciprocally in a straight line, for example.

Figure 18:
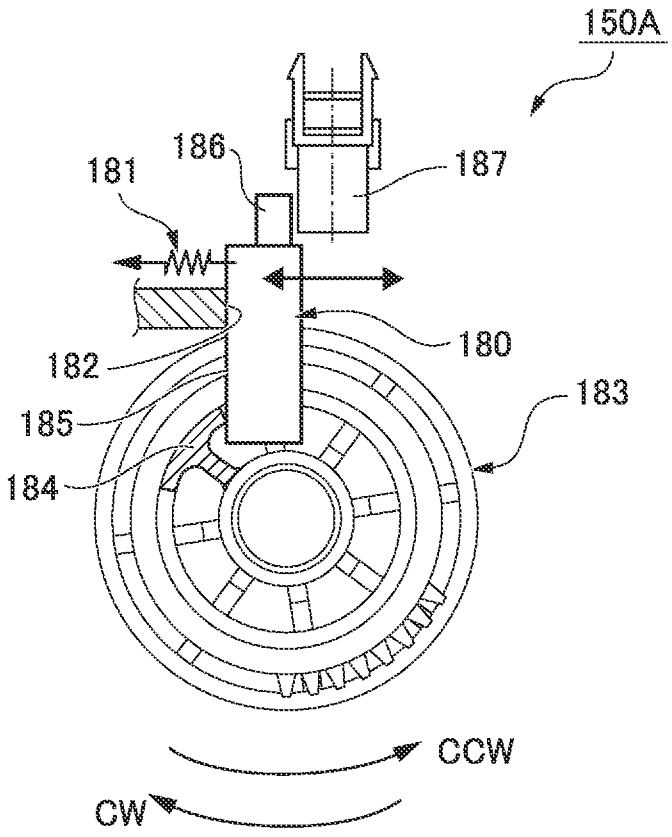
FIG. 18 shows a reference position detection unit according to another embodiment of the invention.

For example, the reference position detection unit 150A shown in FIG. 18 has detection flag plate 180 that moves reciprocally from a first position past a detection position to a second position. A tension spring or other urging member 181 urges the detection flag plate 180 toward the first position. A stop 182 defining the first position is also provided. A rotary-side engaging part 184 is disposed to a compound gear or other rotary member 183, and a flag-side engaging part 185 that can engage the rotary-side engaging part 184 is formed on the first position side of the detection flag plate 180. A detector 187 is disposed to a position where the flag 186 can be detected when the detection flag plate 180 passes the detection position. Because the detection flag plate 180 moves from the first position shown in the figure to a second position in conjunction with rotation of the rotary member 183, the reference position in the direction of rotary member 183 rotation can be set based on the output signal from the detector 187.

The head carriage 59 is supported slidably widthwise to the printer by two first and second guide rails 57, 58 in the printer 1 described above, and a printhead 22 is mounted on the head carriage 59. The invention can also be applied to a printer configured to support the head carriage slidably widthwise by a single guide rail. In this configuration, a movable rotary shaft with a worm in one place, and a worm wheel attached to an end of the guide rail, can be used instead of the synchronous rotary mechanism described above. The movable rotary shaft and the stationary rotary shaft are also connected by a universal joint in this configuration.

The invention can also be used as a platen gap adjustment mechanism in a line printer.

The foregoing embodiment uses a worm and a worm wheel to transfer rotation of the movable rotary shaft to the guide rail. Alternatively, a drive-side bevel gear could be disposed coaxially to the guide rail, and a driven-side bevel gear that meshes with the drive-side bevel gear disposed on the guide rail side.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A reference position detection device of a rotary mechanism, comprising:

a rotary member that can rotate through a rotational angle less than one revolution from a first rotational position past a second rotational position and reference position to a third rotational position;

a detection flag that can move in a range from a first position past a detection position to a second position;

a detector that detects the detection flag passing the detection position; and a flag moving mechanism that engages the rotary member rotating from the second rotational position to the third rotational position and moves the detection flag from the first position to the second position, follows the rotary member rotating from the third rotational position to the second rotational position, and moves the detection flag from the second position to the first position;

the position of detection flag movement when passing the reference position of the rotary member being the detection position;

wherein:

the flag moving mechanism includes a motion limiter that defines the first position of the detection flag, an urging member that urges the detection flag from the second position toward the first position, a rotary-side engaging part formed on the rotary member, and a flag-side engaging part formed on the detection flag;

the rotary-side engaging part, able to engage the flag-side engaging part when the rotary member rotates in the direction from the first rotational position toward the third rotational position; and engagement between the flag-side engaging part and the rotary-side engaging part is maintained by the urging force of the urging member while the rotary member rotates from the third rotational position to the second rotational position.

2. The reference position detection device of a rotary mechanism described in claim 1, wherein:

the detection flag can rotate from the first position to the second position on the same axis of rotation as the rotary member.

3. The reference position detection device of a rotary mechanism described in claim 1, wherein:

the detection flag includes a disc-shaped or annular body, a contact protrusion that protrudes radially to the outside from the outside surface of the body, and a detection protrusion that protrudes radially to the outside from the outside surface of the body at a position circumferentially separated from the contact protrusion;

the motion limiter being positioned in the path of contact stop movement accompanying rotation of the detection flag; and the detector detecting the detection protrusion passing.

4. A reference position detection device of a rotary mechanism, comprising:

a rotary member that can rotate through a rotational angle less than one revolution from a first rotational position past a second rotational position and reference position to a third rotational position;

a detection flag that can move in a range from a first position past a detection position to a second position;

a detector that detects the detection flag passing the detection position;

a flag moving mechanism that engages the rotary member rotating from the second rotational position to the third rotational position and moves the detection flag from the first position to the second position, follows the rotary member rotating from the third rotational position to the second rotational position, and moves the detection flag from the second position to the first position;

the position of detection flag movement when passing the reference position of the rotary member being the detection position; and a control unit that detects a reference position within one revolution of the rotary member based on output of the detector, and controls rotation of the rotary member based on the reference position, the control unit detecting if the detection flag is detected by the detector, when the detection flag is detected by the detector, rotating the rotary member toward the first rotational position, detecting when the detector changes from detecting to not detecting the detection flag, and setting the rotational angle position of the rotary member at that time as the reference position, and when the detection flag is not detected by the detector, rotating the rotary member toward the third rotational position, detecting when the detector changes from not detecting to detecting the detection flag, and setting the rotational angle position of the rotary member at that time as the reference position.

5. A platen gap adjustment mechanism having a motor and a rotary member rotationally driven by the motor, and adjusting the gap between a printhead and a platen based on the rotational angle position within one revolution of the rotary member, the platen gap adjustment mechanism comprising:

a reference position detection device that detects a reference position within one revolution of the rotary member, the reference position detection device being the reference position detection device of a rotary transfer mechanism described in claim 4.

6. A printer comprising the platen gap adjustment mechanism described in claim 5.

* * * * *